(12) United States Patent
Endo et al.

(10) Patent No.: US 11,044,178 B2
(45) Date of Patent: Jun. 22, 2021

(54) DATA CENTER MANAGEMENT METHOD, MANAGEMENT APPARATUS, AND DATA CENTER SYSTEM

(71) Applicant: FUJITSU LIMITED, Kawasaki (JP)

(72) Inventors: Hiroshi Endo, Atsugi (JP); Shigeto Suzuki, Kawasaki (JP); Hiroyoshi Kodama, Isehara (JP); Hiroyuki Fukuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 178 days.

(21) Appl. No.: 15/981,114

(22) Filed: May 16, 2018

(65) Prior Publication Data

US 2018/0337837 A1 Nov. 22, 2018

(30) Foreign Application Priority Data

May 22, 2017 (JP) .............................. JP2017-100705

(51) Int. Cl.
*H04L 12/26* (2006.01)
*H04L 12/24* (2006.01)

(52) U.S. Cl.
CPC ............ *H04L 43/045* (2013.01); *H04L 41/14* (2013.01); *H04L 41/145* (2013.01); *H04L 41/147* (2013.01)

(58) Field of Classification Search
CPC ..... H04L 43/045; H04L 41/14; H04L 41/145; H04L 41/147

(Continued)

(56) References Cited

U.S. PATENT DOCUMENTS 5,121,337 A * 6/1992 Brown ................. G01N 21/274
250/339.12
2009/0248863 A1* 10/2009 Uyama .................. G06Q 30/02
709/224

(Continued)

FOREIGN PATENT DOCUMENTS

JP 9-259110 10/1997
JP 2004355200 A * 5/2003 ............. G06F 19/00

(Continued)

OTHER PUBLICATIONS

Masatoshi Ogawa et al., "Application of Large-Scale Database-Based Online Modeling to Plant State Long-term Estimation", The transactions of the Institute of Electrical Engineers of Japan. C, vol. 131, No. 4, pp. 718-721 (2011).

(Continued)

*Primary Examiner* — Joseph L Greene
(74) *Attorney, Agent, or Firm* — Staas & Halsey LLP

(57) ABSTRACT

A data center management method executed by a computer that includes a first memory and a second memory, the method includes storing, in the second memory, a predicted value calculated based on measured values obtained as measurement data and differences each corresponding to the measurement data obtained a predetermined period ago; storing, in the first memory, the measurement data as the measured value; calculating, based on each of the stored measured values, an amount of change which is a difference between the measured value and the predicted value, and storing the calculated amount in the second memory; calculating first corrected prediction data based on the measured value currently measured and the measurement values previously measured; calculating second corrected prediction data based on previous amounts of change and the first corrected prediction data; and controlling the device using an operation amount calculated based on the second corrected prediction data.

11 Claims, 29 Drawing Sheets

(58) Field of Classification Search
USPC .......................................................... 709/224
See application file for complete search history.

(56) References Cited

U.S. PATENT DOCUMENTS

2013/0190899 A1* 7/2013 Slessman ............... G05B 13/02
700/28
2017/0094920 A1* 4/2017 Ellins .................... A01G 31/02

FOREIGN PATENT DOCUMENTS

JP        2010108283 A   * 10/2008
JP        2015-90691        5/2015

OTHER PUBLICATIONS

Ushida Shun et al., "Identification and Control of Nonlinear System Utilizing the Junst-In-Time Modeling Technique", Journal of the Society of Instrument and Control Engineers, vol. 44, No. 2, pp. 102-106 (2005).
Anders Stenman, "Just-in-Time Models with Applications to Dynamical Systems", Linkoping Studies in Science and Technology, Thesis No. 601, Mar. 1997, 110 pp.

* cited by examiner

FIG. 2

| DATE AND TIME | TEMPERATURE A AT LOCATION a (°C) | POWER CONSUMPTION B OF DEVICE b (kW) | HUMIDITY C AT LOCATION c (%) | FREQUENCY OF ROTATION D OF FAN IN DEVICE d (rpm) | CPU USE RATE E OF DEVICE e (%) | OPERATING RATE F OF COMPRESSOR IN DEVICE f (%) | ... |
|---|---|---|---|---|---|---|---|
| ... | ... | ... | ... | ... | ... | ... | ... |
| APRIL 1 16:00 | 20.3 | 3.0 | 70 | 4000 | 20 | 20 | ... |
| APRIL 1 16:10 | 20.1 | 3.1 | 69 | 4000 | 20 | 20 | ... |
| APRIL 1 16:20 | 22.8 | 4.1 | 60 | 4000 | 100 | 20 | ... |
| APRIL 1 16:30 | 25.8 | 4.0 | 52 | 4500 | 100 | 30 | ... |
| APRIL 1 16:40 | 25.5 | 3.9 | 52 | 4500 | 100 | 30 | ... |
| APRIL 1 16:50 | 21.4 | 3.0 | 69 | 4500 | 20 | 20 | ... |
| APRIL 1 17:00 | 21.5 | 3.1 | 64 | 4500 | 20 | 10 | ... |

FIG. 8

| MEASUREMENT TIME POINT | MEASURED VALUE $x_A$ OF TEMPERATURE A AT LOCATION a | MEASURED VALUE $x_B$ OF POWER CONSUMPTION B OF DEVICE b | MEASURED VALUE $x_C$ OF HUMIDITY C AT LOCATION c | MEASURED VALUE $x_D$ OF FREQUENCY OF ROTATION D OF FAN IN DEVICE d | MEASURED VALUE $x_E$ OF CPU USE RATE E OF DEVICE e | MEASURED VALUE $x_F$ OF OPERATING RATE F OF COMPRESSOR IN DEVICE f |
|---|---|---|---|---|---|---|
| ... | ... | ... | ... | ... | ... | ... |
| t-6 | $x_A[t-6]$ | $x_B[t-6]$ | $x_C[t-6]$ | $x_D[t-6]$ | $x_E[t-6]$ | $x_F[t-6]$ |
| t-5 | $x_A[t-5]$ | $x_B[t-5]$ | $x_C[t-5]$ | $x_D[t-5]$ | $x_E[t-5]$ | $x_F[t-5]$ |
| t-4 | $x_A[t-4]$ | $x_B[t-4]$ | $x_C[t-4]$ | $x_D[t-4]$ | $x_E[t-4]$ | $x_F[t-4]$ |
| t-3 | $x_A[t-3]$ | $x_B[t-3]$ | $x_C[t-3]$ | $x_D[t-3]$ | $x_E[t-3]$ | $x_F[t-3]$ |
| t-2 | $x_A[t-2]$ | $x_B[t-2]$ | $x_C[t-2]$ | $x_D[t-2]$ | $x_E[t-2]$ | $x_F[t-2]$ |
| t-1 | $x_A[t-1]$ | $x_B[t-1]$ | $x_C[t-1]$ | $x_D[t-1]$ | $x_E[t-1]$ | $x_F[t-1]$ |
| t | $x_A[t]$ | $x_B[t]$ | $x_C[t]$ | $x_D[t]$ | $x_E[t]$ | $x_F[t]$ |

FIG. 13

| MEASUREMENT TIME POINT | ORIGINAL PREDICTED VALUE $y_A$ OF TEMPERATURE A AT LOCATION a | ORIGINAL PREDICTED VALUE $y_B$ OF POWER CONSUMPTION B OF DEVICE b | ORIGINAL PREDICTED VALUE $y_C$ OF HUMIDITY C AT LOCATION c | ORIGINAL PREDICTED VALUE $y_D$ OF FREQUENCY D OF ROTATION OF FAN IN DEVICE d | ORIGINAL PREDICTED VALUE $y_E$ OF CPU USE RATE E OF DEVICE e | ORIGINAL PREDICTED VALUE $y_F$ OF OPERATING RATE F OF COMPRESSOR IN DEVICE f | ... |
|---|---|---|---|---|---|---|---|
| ... | ... | ... | ... | ... | ... | ... | ... |
| t−3 | $y_A[t-3]$ | $y_B[t-3]$ | $y_C[t-3]$ | $y_D[t-3]$ | $y_E[t-3]$ | $y_F[t-3]$ | |
| t−2 | $y_A[t-2]$ | $y_B[t-2]$ | $y_C[t-2]$ | $y_D[t-2]$ | $y_E[t-2]$ | $y_F[t-2]$ | |
| t−1 | $y_A[t-1]$ | $y_B[t-1]$ | $y_C[t-1]$ | $y_D[t-1]$ | $y_E[t-1]$ | $y_F[t-1]$ | |
| t | $y_A[t]$ | $y_B[t]$ | $y_C[t]$ | $y_D[t]$ | $y_E[t]$ | $y_F[t]$ | |

| t+1 | $y_A[t+1]$ | $y_B[t+1]$ | $y_C[t+1]$ | $y_D[t+1]$ | $y_E[t+1]$ | $y_F[t+1]$ | ... |

FIG. 14

| MEASUREMENT TIME POINT | SECOND DIFFERENCE $S_{A1}$ WITH GOING-BACK COUNT OF 1 | SECOND DIFFERENCE $S_{A2}$ WITH GOING-BACK COUNT OF 2 | ... | SECOND DIFFERENCE $S_{A5}$ WITH GOING-BACK COUNT OF 5 |
|---|---|---|---|---|
| ... | ... | ... | ... | ... |
| t-3 | $S_{A1}[t-3]=y_A[t-3]-x_A[t-4]$ | $S_{A2}[t-3]=y_A[t-3]-x_A[t-5]$ | ... | $S_{A5}[t-3]=y_A[t-3]-x_A[t-8]$ |
| t-2 | $S_{A1}[t-2]=y_A[t-2]-x_A[t-3]$ | $S_{A2}[t-2]=y_A[t-2]-x_A[t-4]$ | ... | $S_{A5}[t-2]=y_A[t-2]-x_A[t-7]$ |
| t-1 | $S_{A1}[t-1]=y_A[t-1]-x_A[t-2]$ | $S_{A2}[t-1]=y_A[t-1]-x_A[t-3]$ | ... | $S_{A5}[t-1]=y_A[t-1]-x_A[t-6]$ |
| t | $S_{A1}[t]=y_A[t]-x_A[t-1]$ | $S_{A2}[t]=y_A[t]-x_A[t-2]$ | ... | $S_{A5}[t]=y_A[t]-x_A[t-5]$ |

| SECOND DIFFERENCE $S_{B1}$ WITH GOING-BACK COUNT OF 1 | SECOND DIFFERENCE $S_{B2}$ WITH GOING-BACK COUNT OF 2 | ... | SECOND DIFFERENCE $S_{B5}$ WITH GOING-BACK COUNT OF 5 |
|---|---|---|---|
| ... | ... | ... | ... |
| $S_{B1}[t-3]=y_B[t-3]-x_B[t-4]$ | $S_{B2}[t-3]=y_B[t-3]-x_B[t-5]$ | ... | $S_{B5}[t-3]=y_B[t-3]-x_B[t-8]$ |
| $S_{B1}[t-2]=y_B[t-2]-x_B[t-3]$ | $S_{B2}[t-2]=y_B[t-2]-x_B[t-4]$ | ... | $S_{B5}[t-2]=y_B[t-2]-x_B[t-7]$ |
| $S_{B1}[t-1]=y_B[t-1]-x_B[t-2]$ | $S_{B2}[t-1]=y_B[t-1]-x_B[t-3]$ | ... | $S_{B5}[t-1]=y_B[t-1]-x_B[t-6]$ |
| $S_{B1}[t]=y_B[t]-x_B[t-1]$ | $S_{B2}[t]=y_B[t]-x_B[t-2]$ | ... | $S_{B5}[t]=y_B[t]-x_B[t-5]$ |

FIG. 18

|  | COEFFICIENT | CONSTANT |
|---|---|---|
| TEMPERATURE A AT LOCATION a | $\alpha_A$ | $\beta_A$ |
| POWER CONSUMPTION B OF DEVICE b | $\alpha_B$ | $\beta_B$ |
| HUMIDITY C AT LOCATION c | $\alpha_C$ | $\beta_C$ |
| FREQUENCY OF ROTATION D OF FAN IN DEVICE d | $\alpha_D$ | $\beta_D$ |
| CPU USE RATE E OF DEVICE e | $\alpha_E$ | $\beta_E$ |
| OPERATING RATE F OF COMPRESSOR IN DEVICE f | $\alpha_F$ | $\beta_F$ |

US 11,044,178 B2

DATA CENTER MANAGEMENT METHOD, MANAGEMENT APPARATUS, AND DATA CENTER SYSTEM

CROSS-REFERENCE TO RELATED APPLICATION

This application is based upon and claims the benefit of priority of the prior Japanese Patent Application No. 2017-100705, filed on May 22, 2017, the entire contents of which are incorporated herein by reference.

FIELD

The embodiment discussed herein is related to a data center management method, a management apparatus, and a data center system.

BACKGROUND

For example, in a data center where a large number of information and communication technology (ICT) devices are installed, an air conditioner is used to limit temperature rises in the room housing the ICT devices.

In this regard, it is easy to maintain a target environment when changes in measurement indices related to air conditioning (for example, temperature and humidity) are predicted and the air conditioner is controlled based on the prediction.

However, when the prediction intervals are too long and not suitable for the speed at which a measurement index changes, a change in the predicted value may lag behind a change in the measured value. Thus, the above-described prediction of measurement indices is not accurate all the time.

Japanese Laid-open Patent Publication No. 2015-90691 discloses that a prediction model based on a linear regression model is changed when a deviation of prediction data from actual result data exceeds a threshold. The above patent document also discloses that a corrected prediction model is used when a deviation of prediction data in a shorter period exceeds a threshold.

Further, Japanese Laid-open Patent Publication No. 9-259110 discusses data fluctuation prediction and assignment of weights according to prediction accuracy to the past amounts of change in measurement values. For example, other related arts is as follows.

Ogawa. Masatoshi, Ogai. Harutoshi, "Application of Large-Scale Database-Based Online Modeling to Plant State Long-Term Estimation", The transactions of the Institute of Electrical Engineers of Japan. C, Vol. 131 No. 4 pp. 718 to 721 (2011) (Non-patent Document 1)

Ushida. Shun, Kimura. Hidenori, "Identification and Control of Nonlinear System Utilizing the Just-In-Time Modeling Technique", Journal of the Society of Instrument and Control Engineers, Vol. 44 No. 2 pp. 102 to 106 (2005) (Non-patent Document 2)

Anders Stenman, "Just-in-Time Models with Applications to Dynamical System", Linkoping Studies in Science and Technology, Thesis No. 601, March 1997 (Non-patent Document 3)

It is desirable to improve the accuracy of predicting measurement indices used in environment management of a data center.

SUMMARY

According to an aspect of the invention, a data center management method executed by a computer that manages a data center and includes a first memory and a second memory, the first memory being configured to store measured values obtained as measurement data for a device in the data center, and differences each corresponding to the measurement data obtained a predetermined period ago, the data center management method includes storing, in the second memory, a predicted value calculated based on the measurement data and the differences; storing, in the first memory, the measured measurement data as the measured value; calculating, based on each of the measured values stored in the first memory, an amount of change which is a difference between the measured value and the predicted value, and storing the calculated amount of change in the second memory; calculating first corrected prediction data based on the measured value currently measured and the measurement values previously measured and stored in the first memory, the first corrected prediction data being data obtained by correction of the predicted value; calculating second corrected prediction data based on previous amounts of change and the first corrected prediction data, the second corrected prediction data being data obtained by correction of the first corrected prediction data; and controlling the device using an operation amount calculated based on the second corrected prediction data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating examples of measurement data;

FIG. 8 is a diagram illustrating an example of a measured value table;

FIG. 13 is a diagram illustrating an example of an original predicted value table;

FIG. 14 is a diagram illustrating an example of a second difference table;

FIG. 18 is a diagram illustrating an example of a first approximate equation table;

DESCRIPTION OF EMBODIMENT

Figure 1:
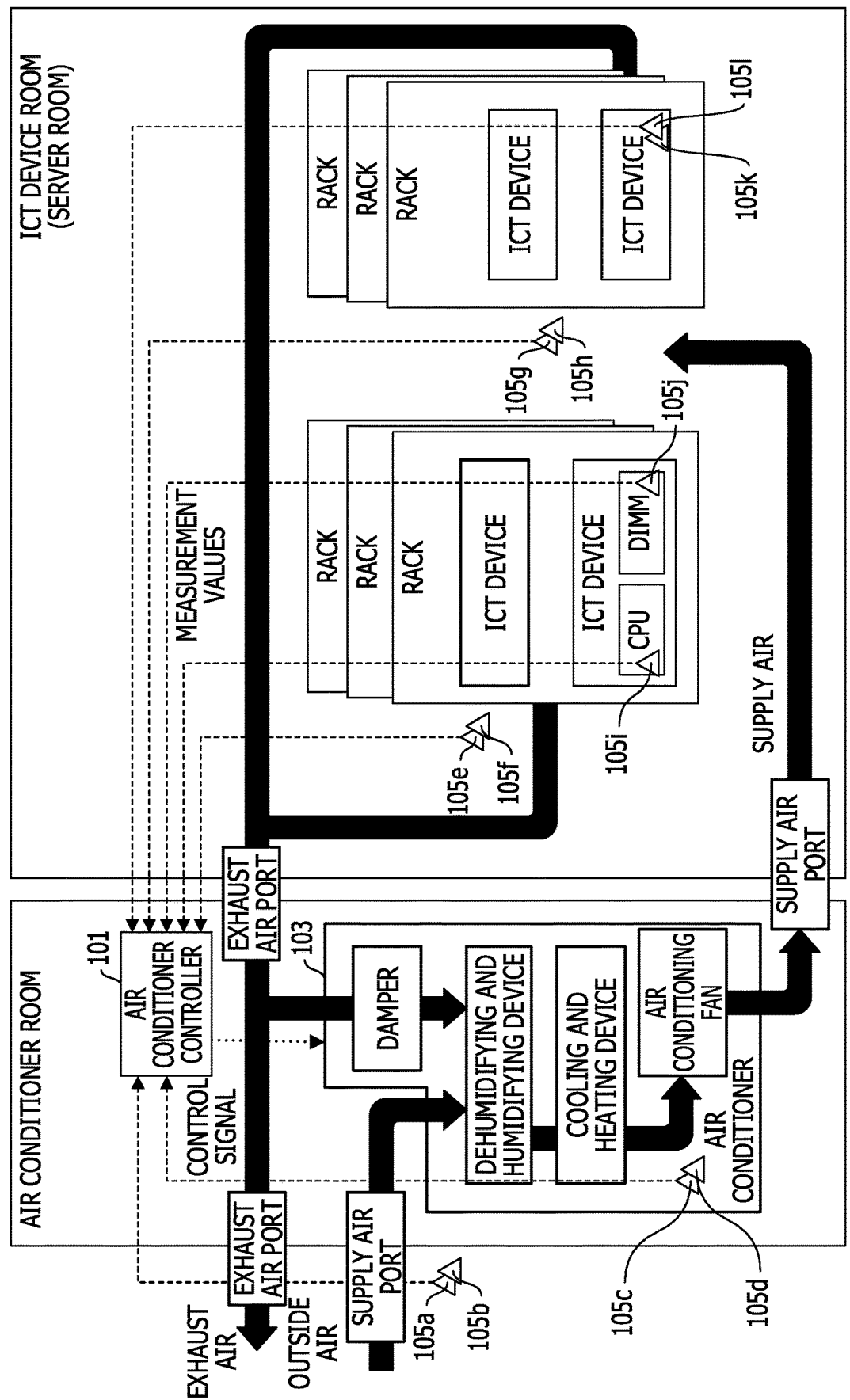
FIG. 1 is a diagram illustrating example configurations of an ICT device room and an air conditioner room in a data center.

FIG. 1 illustrates example configurations of an ICT device room and an air conditioner room in a data center. ICT devices are housed in racks and installed in the ICT device room. Each ICT device heats up when a central processing unit (CPU), which is an arithmetic processing device, and a dual in-line memory module (DIMM), which is a storage device, operate. An air conditioner is used to cool the ICT devices down. When the ICT devices are servers, the ICT device room may be called a server room.

Although FIG. 1 depicts only one air conditioner 103, more than one air conditioner 103 may be installed. The air conditioner 103 circulates air to adjust humidity and temperature. To this end, the air conditioner 103 has a dehumidifying and humidifying device to adjust humidity and a cooling and heating device to adjust temperature. The air conditioner 103 has an air conditioning fan to send out air. Air sent out from the air conditioner 103 is sent into the ICT device room through an air supply port.

Meanwhile, air inside the ICT device room is returned to the air conditioner room through an exhaust air port. The air returned to the air conditioner room is discharged outdoors through an exhaust air port in the air conditioner room. Part of the air returned to the air conditioner room is taken into the air conditioner 103 through a damper.

As illustrated in FIG. 1, various sensors 105 are installed at locations inside and outside the data center. A sensor 105*a* installed outdoors measures the dry-bulb temperature of outside air. A sensor 105*b* also installed outdoors measures the relative humidity of outside air. A sensor 105*c* installed in the air conditioner 103 measures the power consumption of the air conditioner 103. A sensor 105*d* also installed in the air conditioner 103 acquires a value indicating the operation state of the air conditioner 103. A sensor 105*e* installed behind the racks in the ICT device room measures the dry-bulb temperature behind the racks. A sensor 105*f* also installed behind the racks measures the relative humidity behind the racks. A sensor 105*g* installed in front of the racks in the ICT device room measures the dry-bulb temperature in front of the racks. A sensor 105*h* also installed in front of the racks measures the relative humidity in front of the racks. A sensor 105*i* installed in each ICT device measures the dry-bulb temperature inside the ICT device. A sensor 105*j* also installed in each ICT device measures the relative humidity inside the ICT device. A sensor 105*k* installed in each ICT device measures the power consumption of the ICT device. A sensor 105*l* also installed in each ICT device acquires a value indicating the operation state of the ICT device. Various other sensors 105 may additionally be used.

Based on data collected from these sensors 105, an air conditioner controller 101 controls the air conditioner 103. Measurement data collected by the air conditioner controller 101 are now described. FIG. 2 illustrates examples of measurement data. The measurement data may be collected periodically. For example, the measurement data are collected at 10-minute intervals. The example in FIG. 2 depicts temperature A at a location a, power consumption B of a device b, humidity C at a location c, frequency of rotation D of a fan in a device d, CPU use rate E of a device e, and operating rate F of a compressor in a device f. Hereinafter, the temperature A at the location a may be referred to as an index A; the consumption power B of the device b, an index B; the humidity C at the location c, an index C; the frequency of rotation D of the fan in the device d, an index D; the CPU use rate E of the device e, an index E; and the operating rate F of the compressor in the device f, an index F. Although omitted in FIG. 2, measurement data other than these indices are also collected.

To control the air conditioner 103, with respect to some of the indices, the air conditioner controller 101 predicts values to be measured in the future. In this example, the index A to the index F are targeted for the prediction. As to the prediction target indices, measurement values for the next measurement are predicted.

The air conditioner controller 101 obtains adjustment amounts to increase or decrease operation amounts set in the air conditioner 103 based on predicted values, and converts the adjustment amounts to control signals. The air conditioner controller 101 then transmits the control signals to the air conditioner 103 and thereby controls the air conditioner 103.

Figure 3:
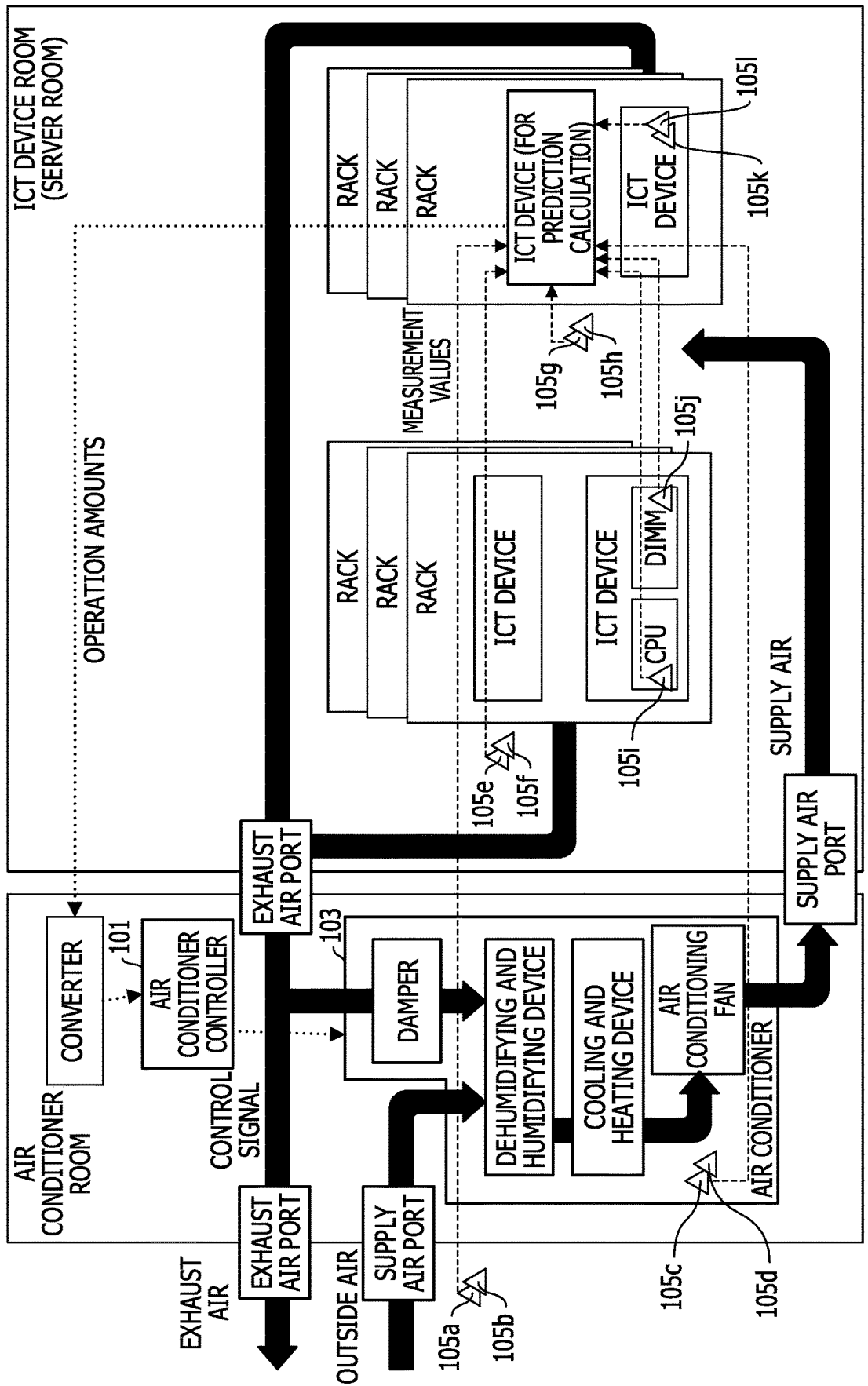
FIG. 3 is a diagram illustrating example configurations of an ICT device room and an air conditioner room in a data center.

As illustrated in FIG. 3, a certain ICT device in the ICT device room may collect the measurement data and calculate predicted values. In the example illustrated in FIG. 3, the ICT device that calculates predicted values sends operation amounts for the air conditioner 103 to a converter. The converter obtains adjustment amounts for the operation amounts and transmits the adjustment amounts to the air conditioner controller 101. The air conditioner controller 101 converts the adjustment amounts into control signals and transmits the control signals to the air conditioner 103.

The above-described air conditioner controller 101 or the ICT device that calculates predicted values predicts values to be measured in the future based for example on just-in-time (JIT) modeling. Details of prediction processing based on JIT modeling are disclosed in Non-patent Documents 1 to 3. A method other than JIT modeling may be used to calculate predicted values.

Note that a calculated predicted value may contain error. For example, an index for the temperature inside an ICT device may change drastically. For such an index that changes drastically, a change in a predicted value may lag behind a change in a measured value. The embodiment corrects such error. Specifically, first correction and second correction are performed.

Figure 4A:
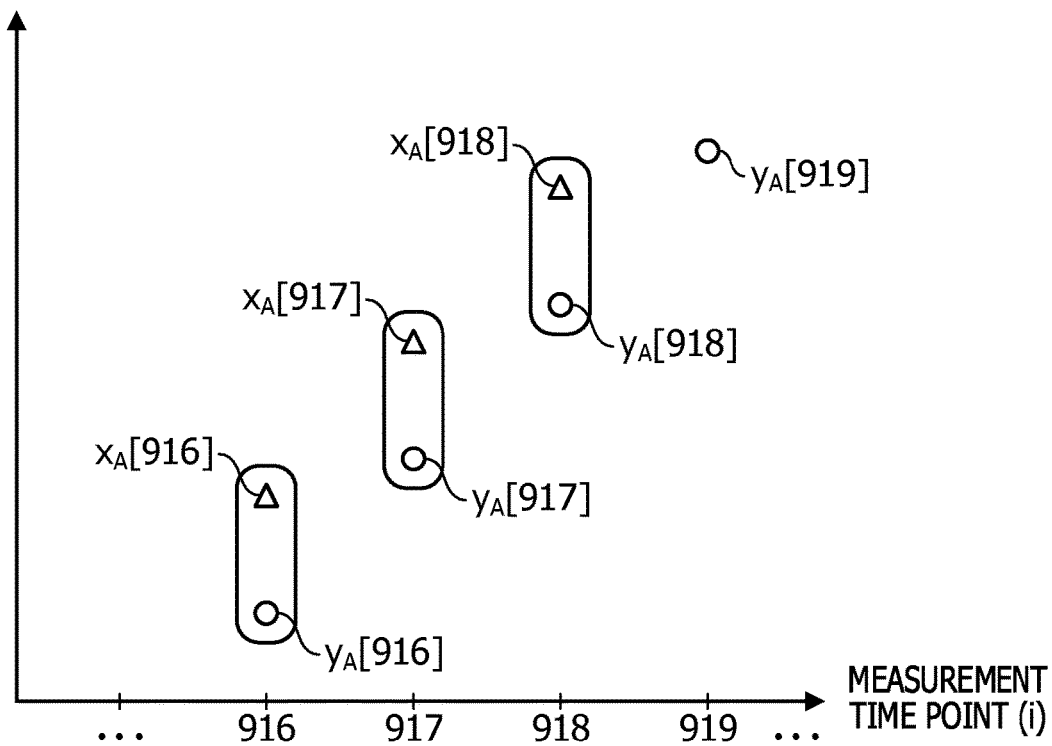
FIG. 4A is a diagram illustrating an outline of first correction.

FIG. 4A illustrates an outline of the first correction. The upper graph depicts measured values and predicted values of the index A. The vertical axis represents measured values $x_A[i]$ and predicted values $y_A[i]$. The horizontal axis represents a measurement time point i.

In the example illustrated in FIG. 4A, at the 916-th measurement time point, the air conditioner controller 101 acquires a measured value $x_A[916]$ of the index A and also calculates a predicted value $y_A[917]$ of the index A for the 917-th measurement. Thereafter, at the 917-th measurement time point, the air conditioner controller 101 acquires a measured value $x_A[917]$ of the index A and also calculates a predicted value $y_A[918]$ of the index A for the 918-th measurement. Similarly, at the 918-th measurement time point, the air conditioner controller 101 acquires a measured value $x_A[918]$ of the index A and also calculates a predicted value $y_A[919]$ of the index A for the 919-th measurement.

As illustrated in FIG. 4A, the predicted value $y_A[917]$ is smaller than the measured value $x_A[917]$, and the predicted value $y_A[918]$ is smaller than the measured value $x_A[918]$. In this example, it is conceivable that the predicted values $y_A$ are smaller than the measured values $x_A$ due to a rapid rise of the index A.

The first correction uses regression analysis that samples pairs of the measured value $x_A[i]$ and the predicted value $y_A[i]$ for the same measurement time point i and determines a first approximate equation for use to calculate an approximation of the predicted value $y_A[i]$ based on the measured value $x_A[i]$. In FIG. 4A, the sampled pairs are surrounded by solid lines.

Then, at the 918-th measurement time point for example, the originally predicted value $y_A[919]$ is converted to a corrected predicted value $y_A^{<1>}[919]$ using a first correction equation. The first correction equation is an equation in which the relation between the predicted value $y_A[i]$ and the measured value $x_A[i]$ in the first approximate equation is applied to the predicted value $y_A[919]$ before the first correction and the predicted value $y_A^{<1>}[919]$ after the first correction. Hereinbelow, an originally predicted value is called an original predicted value, and a predicted value after the first correction is called a first predicted value. The superscript number in angle brackets in the variable denotation of a first predicted value indicates the number of corrections the value has undergone. In this example, <1> represents that the predicted value has been corrected once. Detailed descriptions are given later of the first approximate equation and the first correction equation.

Figure 4B:
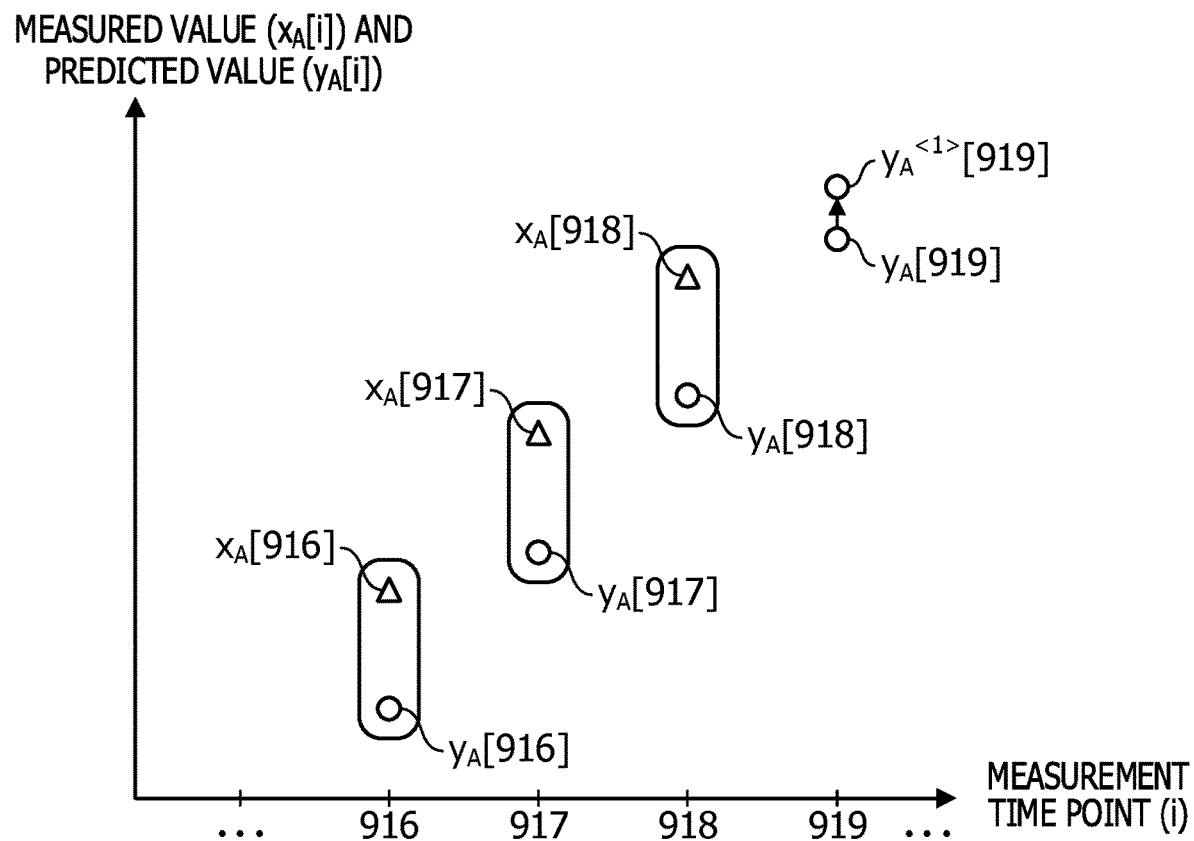
FIG. 4B is a diagram illustrating an outline of first correction.

In an example illustrated in FIG. 4B, it is expected that the first predicted value $y_A^{<1>}[919]$ is larger than the original predicted value $y_A[919]$ and is closer to the measured value $x_A[919]$.

Figure 5A:
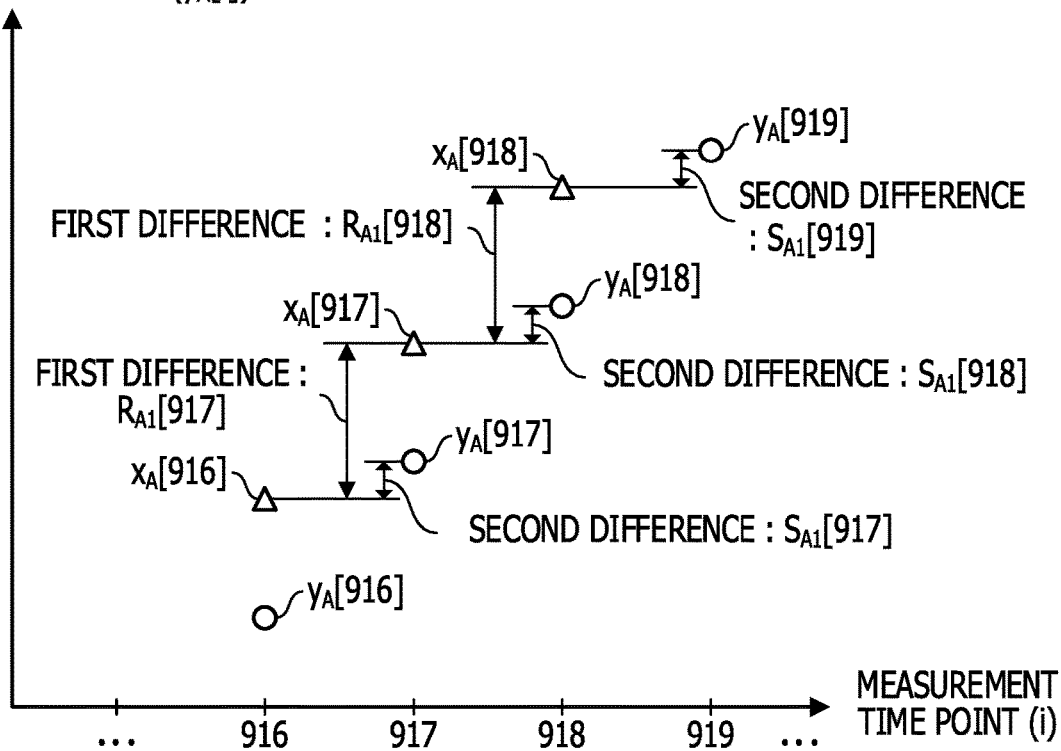
FIG. 5A is a diagram illustrating an outline of second correction.

In the second correction, the first predicted value is further corrected. The second correction may not be complete with one correction. In other words, correction may be performed through two or more stages. Using FIG. 5A, a description is given below of the first stage of the second correction.

The second correction obtains first differences concerning measured values and second differences concerning predicted values and focuses on the relations between the first differences and the second differences. In the first stage of correction, the first differences and the second differences are obtained based on the past measurement which goes back from the current measurement by one measurement time point. In other words, the going-back count is 1 in the first stage of correction.

For example, a first difference $R_{A1}[917]$ for the 917-th measurement is obtained by subtraction of the measured value $x_A[916]$ from the measured value $x_A[917]$. A second difference $S_{A1}[917]$ for the 917-th measurement is obtained by subtraction of the measured value $x_A[916]$ from the predicted value $y_A[917]$. Similarly, a first difference $R_{A1}[918]$ for the 918-th measurement is obtained by subtraction of the measured value $x_A[917]$ from the measured value $x_A[918]$. A second difference $S_{A1}[918]$ for the 918-th measurement is obtained by subtraction of the measured value $x_A[917]$ from the predicted value $y_A[918]$. The subscript 1 in the variable denotations of the first and second differences represents that the going-back count is 1.

The second correction uses regression analysis sampling pairs of the first difference $R_{A1}[i]$ and the second difference $S_{A1}[i]$ for the same measurement time point and determines a second approximate equation for use to calculate an approximation of the second difference $S_{A1}[i]$ based on the first difference $R_{A1}[i]$.

Then, at the 918-th measurement time point for example, the first predicted value $y_A^{<1>}[919]$ is converted to a second predicted value $y_A^{<2>}[919]$ with a going-back count of 1 using a second correction equation. The second correction equation is an equation in which the relation between the predicted value $y_A[i]$ and the measured value $x_A[i]$ in the second approximate equation is applied to the predicted value $y_A^{<1>}[919]$ before the second correction and the predicted value $y_A^{<2>}[919]$ after the second correction. Detailed descriptions are given later of the second approximate equation and the second correction equation.

Figure 5B:
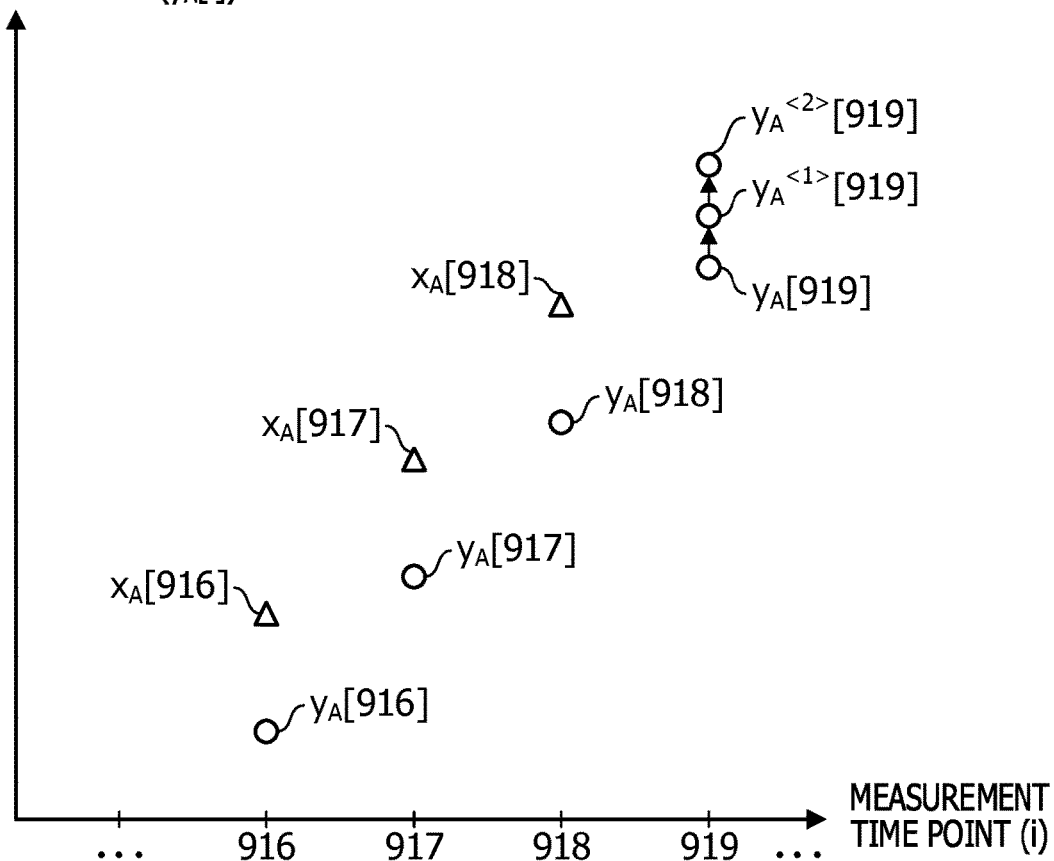
FIG. 5B is a diagram illustrating an outline of second correction.

In an example illustrated in FIG. 5B, it is expected that the second predicted value $y_A^{<2>}[919]$ is larger than the first predicted value $y_A^{<1>}[919]$ and is further closer to the measured value $x_A[919]$.

If a predetermined condition is not met, the going-back count is incremented by one to perform the next stage of correction. If the predetermined condition is met, the second correction is ended with this stage. A detailed description of the second correction is given later. This is the end of the description of the outline of the present embodiment.

Figure 6:
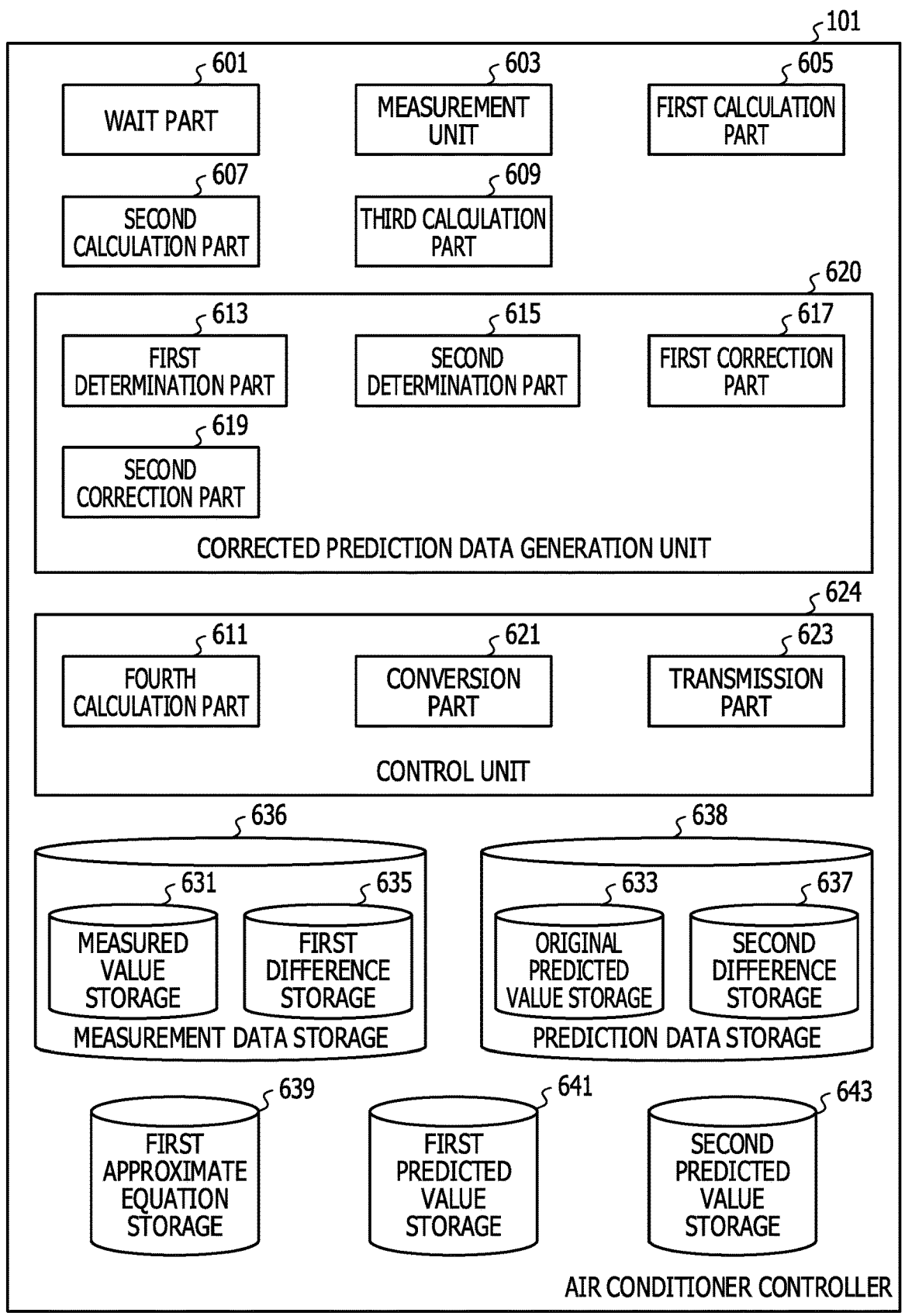
FIG. 6 is a diagram illustrating an example module configuration of an air conditioner controller.

Hereinbelow, the operation of the air conditioner controller 101 is described in accordance with the configuration illustrated in FIG. 1. FIG. 6 illustrates an example module configuration of the air conditioner controller 101. The air conditioner controller 101 includes a wait part 601, a measurement part 603, a first calculation part 605, a second calculation part 607, a third calculation part 609, a fourth calculation part 611, a first determination part 613, a second determination part 615, a first correction part 617, a second correction part 619, a conversion part 621, and a transmission part 623.

The wait part 601 performs processing to wait for measurement timing. The measurement part 603 acquires values measured by the sensors 105. The first calculation part 605 performs processing to calculate predicted values. The processing to calculate predicted values is described later using FIG. 11. The second calculation part 607 performs processing to calculate first differences. The processing to calculate first differences is described later using FIG. 10. The third calculation part 609 performs processing to calculate second differences. The processing to calculate second differences is described later using FIG. 15. The fourth calculation part 611 calculates operation amounts for the air conditioner 103 based on predicted values of the indices.

The first determination part 613 performs processing to determine first approximate equations. The processing to determine first approximate equations is described later using FIG. 16. The second determination part 615 performs processing to determine second approximate equations. The processing to determine second approximate equations is described later using FIG. 22. The first correction part 617 performs first correction processing. The first correction processing is described later using FIG. 19. The second correction part 619 performs second correction processing. The second correction processing is described later using FIG. 24.

The first determination part 613, the second determination part 615, the first correction part 617, and the second correction part 619 correspond to a corrected prediction data generation unit 620 that generates corrected prediction data.

The conversion part 621 converts an adjustment amount for an operation amount set in the air conditioner 103 into a control signal. The transmission part 623 transmits a control signal to the air conditioner 103.

The fourth calculation part 611, the conversion part 621, and the transmission part 623 correspond to a control unit 624 that controls the air conditioner 103.

The air conditioner controller 101 further includes a measured value storage 631, an original predicted value storage 633, a first difference storage 635, a second difference storage 637, a first approximate equation storage 639, a first predicted value storage 641, and a second predicted value storage 643.

The measured value storage 631 stores a measured value table. The measured value table is described using FIG. 8. The original predicted value storage 633 stores an original predicted value table. The original predicted value table is described later using FIG. 13. The first difference storage 635 stores a first difference table. The first difference table is described later using FIG. 9. The second difference storage 637 stores a second difference table. The second difference table is described later using FIG. 14. The first approximate equation storage 639 stores a first approximate equation table. The first approximate equation table is described later using FIG. 18. The first predicted value storage 641 stores a first predicted value table. The first predicted value table is described later using FIG. 20. The second predicted value storage 643 stores a second predicted value table. The second predicted value table is described later using FIG. 25.

A table integrating the measured value table and the first difference table may be stored in a measurement data storage 636. In this case, the measurement data storage 636 integrally includes the measured value storage 631 and the first difference storage 635.

Further, a table integrating the original predicted value table and the second difference table may be stored in a prediction data storage 638. In this case, the prediction data storage 638 integrally includes the original predicted value storage 633 and the second difference storage 637.

The wait part 601, the measurement part 603, the first calculation part 605, the second calculation part 607, the third calculation part 609, the fourth calculation part 611, the first determination part 613, the second determination part 615, the first correction part 617, the second correction part 619, the conversion part 621, and the transmission part 623 described above are implemented using hardware resources (for example, FIG. 27) and programs that cause the processor to execute the processing to be described below.

Figure 27:
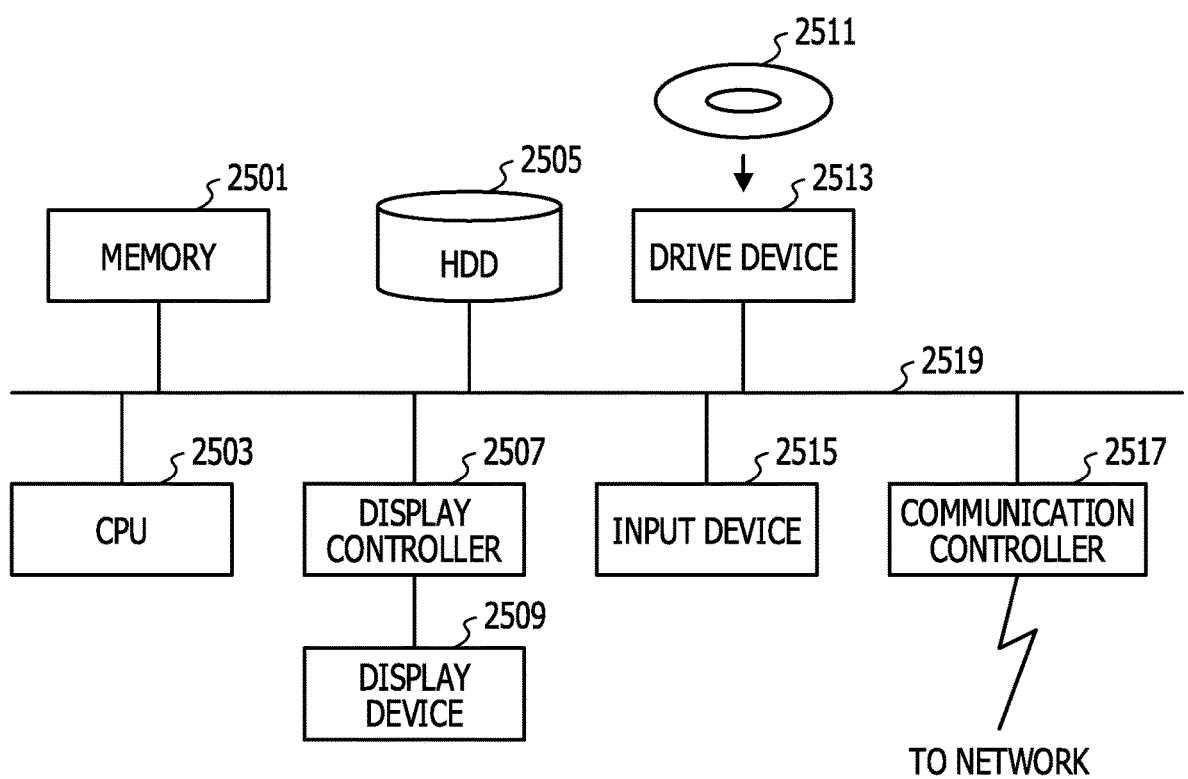
FIG. 27 is a functional block diagram of a computer.

The measured value storage 631, the original predicted value storage 633, the first difference storage 635, the second difference storage 637, the first approximate equation storage 639, the first predicted value storage 641, and the second predicted value storage 643 described above are implemented using hardware resources (for example, FIG. 27).

Figure 7:
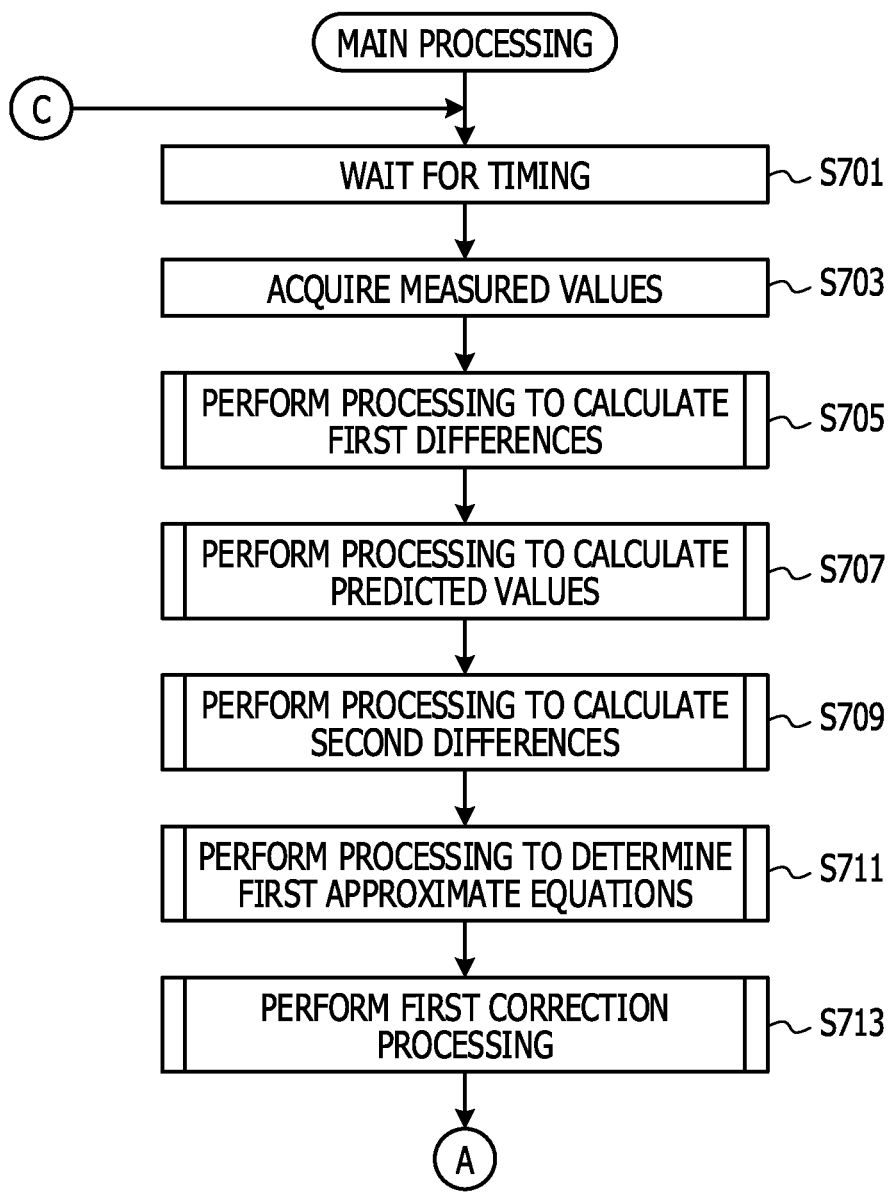
FIG. 7 is a diagram illustrating a flowchart of main processing.

Next, a description is given of processing performed by the air conditioner controller 101. FIG. 7 illustrates a flowchart of the main processing performed by the air conditioner controller 101. The wait part 601 waits for measurement timing (S701). In this example, measurement is performed at certain intervals (for example, 10 minutes).

The measurement part 603 acquires values measured by the sensors 105, namely measured values, from the sensors 105 (S703). The measurement part 603 stores the acquired measured values into the measured value table.

FIG. 8 illustrates an example of the measured value table. The measured value table in this example has a record for each measurement time point. Each record in the measured value table has a field for storing a measurement time point, a field for storing a measured value $x_A$ of the temperature A at the location a, a field for storing a measured value $x_B$ of the consumption power B of the device b, and a field for storing a measured value $x_C$ of the temperature C at the location c. Each record of the measured value table also has a field for storing a measured value $x_D$ of the frequency of rotation D of the fan in the device d, a field for storing a measured value $x_E$ of the CPU use rate E of the device e, a field for storing a measured value $x_F$ of the operating rate F of the compressor in the device f, and fields for storing measured values x of other indices. In the measurement time point, "t" denotes the number of the measurement currently performed, namely, the number of the current measurement.

Referring back to the flowchart in FIG. 7, the second calculation part 607 performs the processing to calculate first differences (S705). The first differences calculated by the second calculation part 607 are stored into the first difference table.

Figure 9:
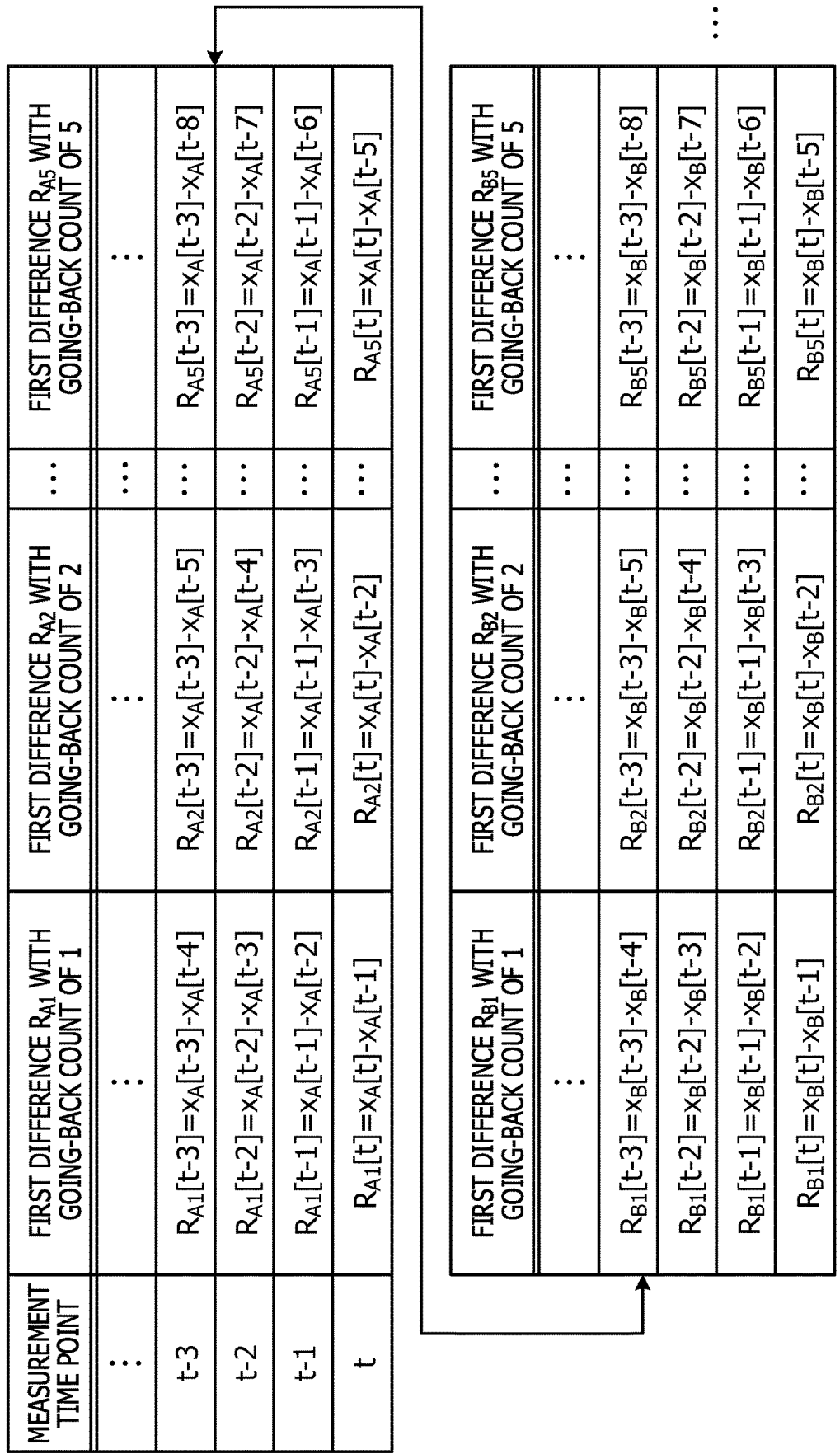
FIG. 9 is a diagram illustrating an example of a first difference table.

FIG. 9 illustrates an example of the first difference table. The first difference table in this example has a record for each measurement time point. Each record in the first difference table has a field for storing a measurement time point, a field for storing first differences $R_{A1}$ to $R_{A5}$ of the index A with going-back counts of 1 to 5, respectively, and a field for storing first differences $R_{B1}$ to $R_{B5}$ of the index B with going-back counts of 1 to 5, respectively.

Each record of the first difference table also has a field for storing first differences $R_{C1}$ to $R_{C5}$ of the index C with going-back counts of 1 to 5, respectively, a field for storing first differences $R_{D1}$ to $R_{D5}$ of the index D with going-back counts of 1 to 5, respectively, a field for storing first differences $R_{E1}$ to $R_{E5}$ of the index E with going-back counts of 1 to 5, respectively, and a field for storing first differences $R_{F1}$ to $R_{F5}$ of the index F with going-back counts of 1 to 5, respectively. FIG. 9, however, omits the fields for storing the first differences of the indices C to F.

Figure 10:
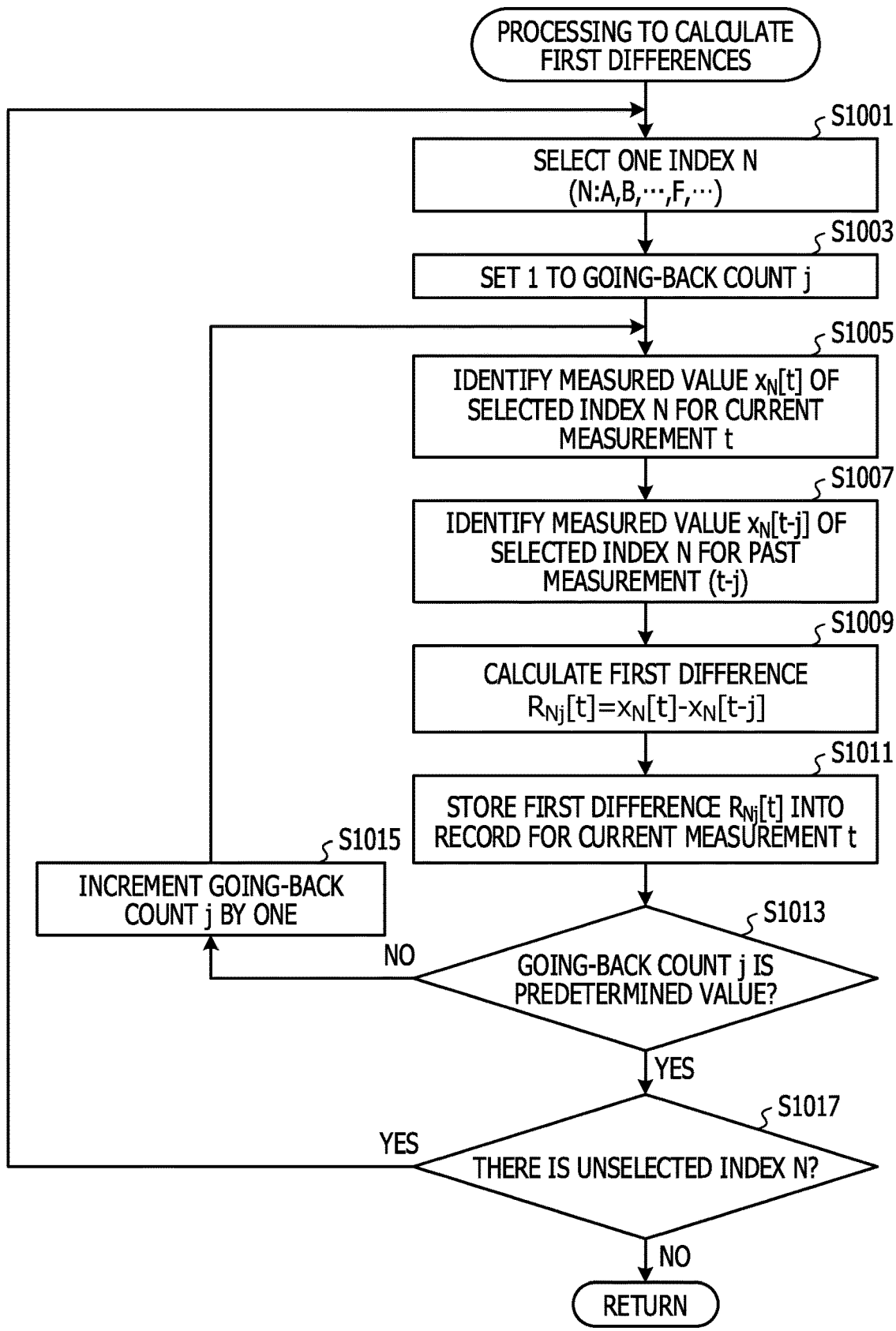
FIG. 10 is a diagram illustrating a flowchart of processing to calculate first differences.

FIG. 10 is a flowchart of the processing to calculate first differences. The second calculation part 607 selects one index N (S1001). In this step, an index other than the prediction indices (indices A to F) may be selected.

The second calculation part 607 sets 1 to a going-back count j which is an internal parameter (S1003). The second calculation part 607 identifies a measured value $x_N[t]$ of the selected index N for the current measurement t (S1005). The second calculation part 607 identifies a measured value $x_N[t-j]$ of the selected index N for the past measurement (t−j) (S1007). The second calculation part 607 then calculates a first difference $R_{Nj}[t]$ (S1009). Specifically, the second calculation part 607 obtains the first difference $R_{Nj}[t]$ by subtracting the measured value $x_N[t-j]$ of the selected index N for the past measurement (t−j) from the measured value $x_N[t]$ of the selected index N for the current measurement t.

The second calculation part 607 stores the first difference $R_{Nj}[t]$ into the record for the current measurement t in the first difference table (S1011). The second calculation part 607 determines whether the going-back count j is equal to a predetermined value (S1013). The predetermined value is an envisaged upper limit of the going-back count (in this example, five).

If it is determined that the going-back count j is not equal to the predetermined value, the second calculation part 607 increments the going-back count j by one (S1015). The flowchart then proceeds back to the processing in S1005 and repeats the above processing.

If it is conversely determined that the going-back count j is equal to the predetermined value, the second calculation part 607 determines whether there is any unselected index N (S1017).

If it is determined that there is any unselected index N, the flowchart proceeds back to the processing in S1001 and repeats the above processing. If it is conversely determined that there is no unselected index N, the processing to calculate first differences is ended, and the flowchart returns to the calling main processing.

Referring back to the flowchart in FIG. 7, the first calculation part 605 performs the processing to calculate predicted values (S707).

Figure 11:
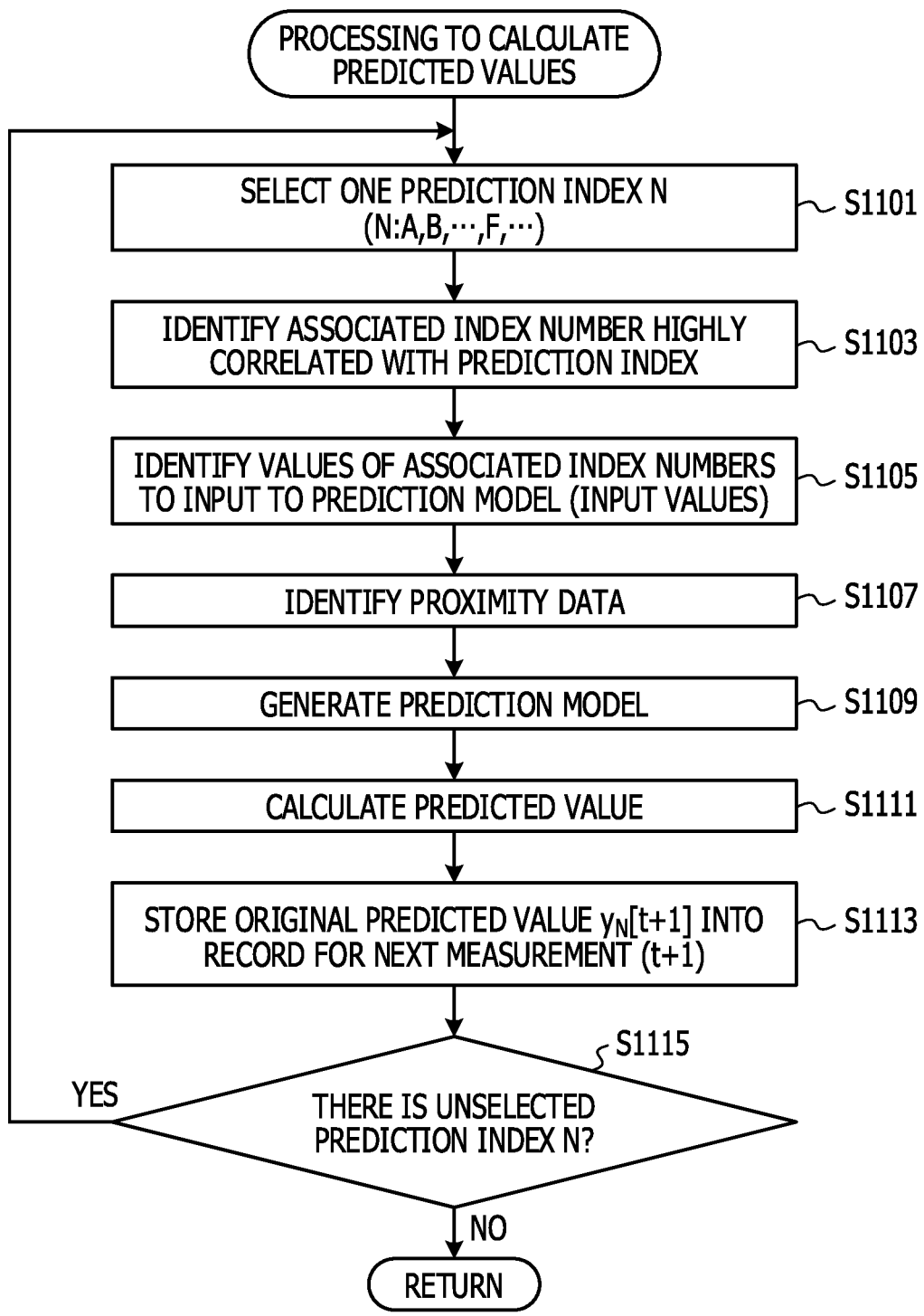
FIG. 11 is a diagram illustrating a flowchart of processing to calculate predicted values.

FIG. 11 illustrates a flowchart of the processing to calculate predicted values. In the processing to calculate predicted values, predicted values are calculated based for example on the above-described JIT modeling. The processing to calculate predicted values is a conventional technique, and is therefore described only briefly herein. The first calculation part 605 selects one prediction index N (S1101). In this example, one of the indices A to F is selected.

Based on the measured values stored in all the items for each measurement time point in the measured value table and the first difference stored in all the items for each measurement time point in the first difference table, the first calculation part 605 identifies an associated index number highly correlated with the prediction index (S1103). The associated index number is identified by an index type and a going-back count. For example, when it is determined that the index B that goes back four measurement time points and the index C that goes back six measurement time points are highly correlated with the index A, the index B with a going-back count of 4 and the index C with a going-back count of 6 are associated indices for the prediction index A. In this example, the first difference may serve as the associated index number.

The first calculation part 605 determines the value of the associated index number to be inputted to the prediction model (hereinafter referred to as an input value) (S1105). To obtain a predicted value for the next measurement (t+1), the input value is the measured value of an associated index for the measurement corresponding to the going-back count of the associated index minus 1. For example, an input value as to the associated index B with a going-back count of 4 is a measured value $x_B[t-3]$ of the index B obtained three measurement time points ago.

Figure 12:
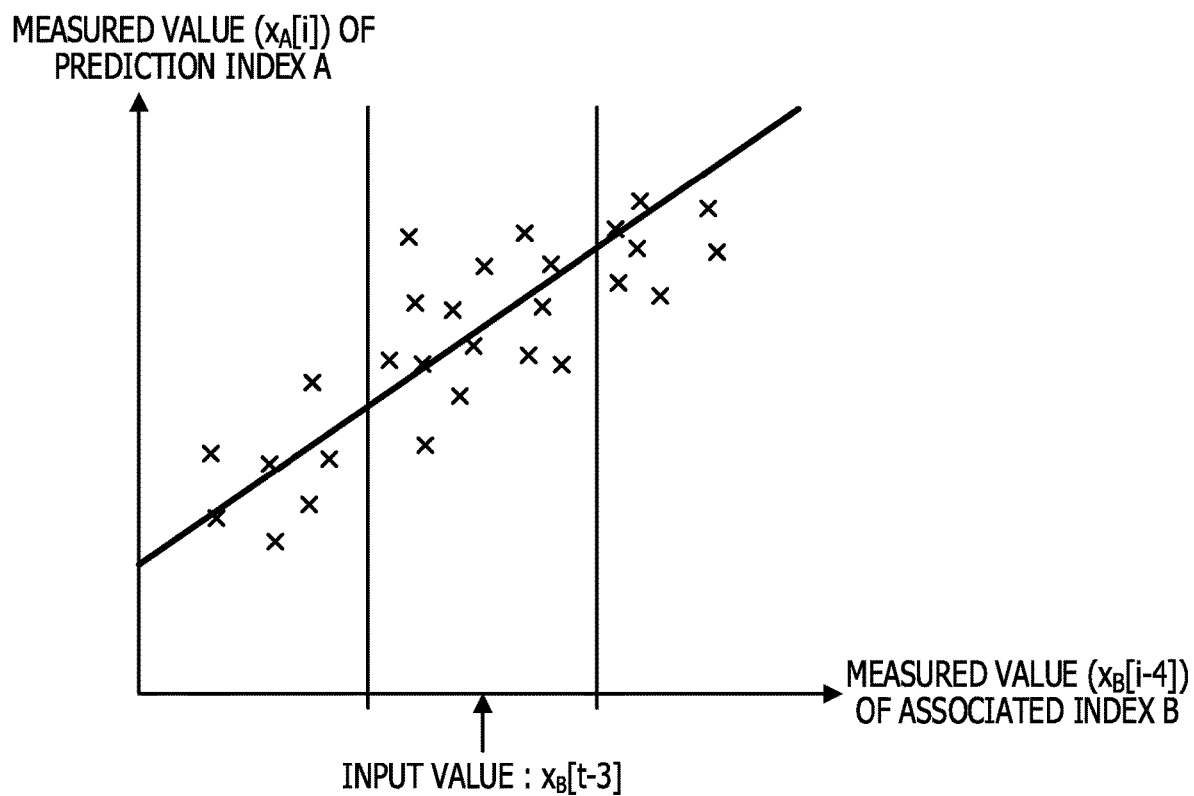
FIG. 12 is a diagram illustrating an example of proximity data.

The first calculation part 605 identifies proximity data (S1107). FIG. 12 illustrates an example of the proximity data. In the example described above, out of the measured values of the associated index B with a going-back count of 4, ones whose difference from the input value is, in absolute value, equal to or below a predetermined value are extracted as samples. In FIG. 12, the points located between the two vertical lines are the samples.

Referring back to the flowchart in FIG. 11, the first calculation part 605 generates a prediction model based on the extracted samples (S1109). Specifically, the first calculation part 605 finds a regression line equation using regression analysis. Then, the regression lines for the respective associated indices are combined to obtain a calculation equation corresponding to a prediction model. FIG. 12 illustrates an example of a regression line.

In the above example where the index B with a going-back count of 4 and the index C with a going-back count of 6 are the associated indices for the prediction index A, the calculation equation is $y_A[t+1]=Q_A[t]+P_{A,B}[t] \times x_B[t-3]+P_{A,C}[t] \times x_C[t-5]$, where $y_A[t+1]$ is a predicted value of the prediction index A for the next measurement (t+1), $Q_A[t]$ is a constant for the prediction of the prediction index A for the current measurement t, $P_{A,B}[t]$ is a coefficient of the associated index B for the prediction of the prediction index A for the current measurement t, $x_B[t-3]$ is a measured value of the index B obtained three measurements ago (this value corresponds to the input value), $P_{A,C}[t]$ is a coefficient of the associated index C for the prediction of the prediction index A for the current measurement t, and $x_C[t-5]$ is a measured value of the index C obtained five measurements ago (this value corresponds to the input value).

The first calculation part 605 applies the input values to the above-described prediction model and thereby calculates a predicted value (S1111). A predicted value obtained using the prediction model is hereinafter referred to as an original predicted value. The first calculation part 605 stores an original predicted value $y_N[t+1]$ into the record for the next measurement (t+1) in the original predicted value table (S1113).

FIG. 13 illustrates an example of the original predicted value table. The original predicted value table in this example has a record for each measurement time point. Each record of the original predicted value table has a field for storing a measurement time point, a field for storing an original predicted value $y_A$ of the temperature A at the location a, a field for storing an original predicted value $y_B$ of the power consumption B of the device b, and a field for storing an original predicted value $y_C$ of the temperature C at the location c. Each record of the original predicted value table also has a field for storing an original predicted value $y_D$ of the frequency of rotation D of the fan in the device d, a field for storing an original predicted value $y_E$ of the CPU use rate E of the device e, a field for storing an original predicted value $y_F$ of the operation rate F of the compressor in the device f.

Referring back to the flowchart in FIG. 11, the first calculation part 605 determines whether there is any unselected prediction index N (S1115). If it is determined that there is any unselected predicted index N, the flowchart proceeds back to the processing in S1101 and repeats the above processing. If it is conversely determined that there is no unselected prediction index N, the processing to calculate predicted values is ended, and the flowchart returns to the calling main processing.

Referring back to the flowchart in FIG. 7, the third calculation part 609 performs the processing to calculate second differences (S709). The second differences calculated by the third calculation part 609 are stored into the second difference table.

FIG. 14 illustrates an example of the second difference table. The second difference table in this example has a record for each measurement time point. Each record of the second difference table has a field for storing a measurement time point, fields for storing second differences $S_{A1}$ to $S_{A5}$ of the index A with going-back counts of 1 to 5, respectively, and fields for storing second differences $S_{B1}$ to $S_{B5}$ of the index B with going-back counts of 1 to 5, respectively.

Each record of the second difference table also has fields for storing second differences $S_{C1}$ to $S_{C5}$ of the index C with going-back counts of 1 to 5, respectively, fields for storing second differences $S_{D1}$ to $S_{D5}$ of the index D with going-back counts of 1 to 5, respectively, fields for storing second differences $S_{E1}$ to $S_{E5}$ of the index E with going-back counts of 1 to 5, respectively, and fields for storing second differences $S_{F1}$ to $S_{F5}$ of the index F with going-back counts of 1 to 5. However, FIG. 14 omits the fields for storing second differences for the indices C to F.

Figure 15:
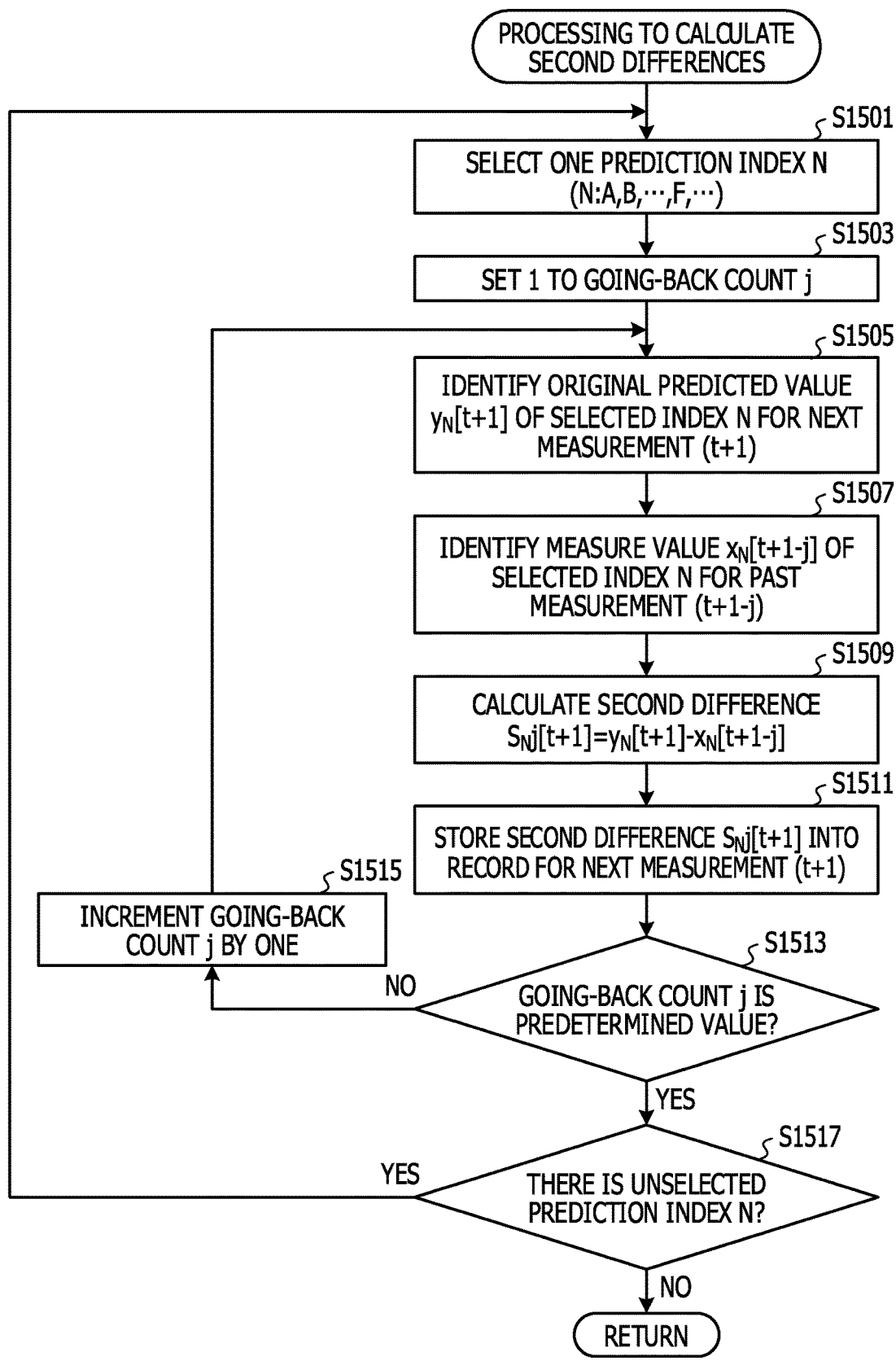
FIG. 15 is a diagram illustrating a flowchart of processing to calculate second differences.

FIG. 15 illustrates a flowchart of the processing to calculate second differences. The third calculation part 609 selects one prediction index N (S1501).

The third calculation part 609 sets 1 to the going-back count j which is an internal parameter (S1503). The third calculation part 609 identifies an original predicted value $y_N[t+1]$ of the selected index N for the next measurement (t+1) (S1505). The third calculation part 609 identifies a measured value $x_N[t+1-j]$ of the selected index N for the past measurement (t+1−j) (S1507). The third calculation part 609 then calculates a second difference $S_N[t+1]$ (S1509). Specifically, the third calculation part 609 obtains the second difference $S_{Nj}[t+1]$ by subtracting the measured value $x_N[t+1-j]$ of the selected index N for the past measurement (t+1-j) from the original predicted value $y_N[t+1]$ of the selected index N for the next measurement (t+1).

The third calculation part 609 stores the second difference $S_{Nj}[t+1]$ into the record for the next measurement (t+1) in the second difference table (S1511). The third calculation part 609 determines whether the going-back count j is equal to a predetermined value (S1513). The predetermined value is an envisaged upper limit of the going-back count (in this example, five).

If it is determined that the going-back count j is not equal to the predetermined value, the third calculation part 609 increments the going-back count j by one (S1515). The third calculation part 609 then proceeds back to the processing in S1505 and repeats the above processing.

If it is conversely determined that the going-back count j is equal to the predetermined value, the third calculation part 609 determines whether there is any unselected index N (S1517).

If it is determined that there is any unselected index N, the third calculation part 609 proceeds back to the processing in S1501 and repeats the above processing. If it is conversely determined that there is no unselected index N, the third calculation part 609 ends the processing to calculate second differences and returns to the calling main processing.

Referring back to the flowchart in FIG. 7, the first determination part 613 performs the processing to determine first approximate equations (S711).

Figure 16:
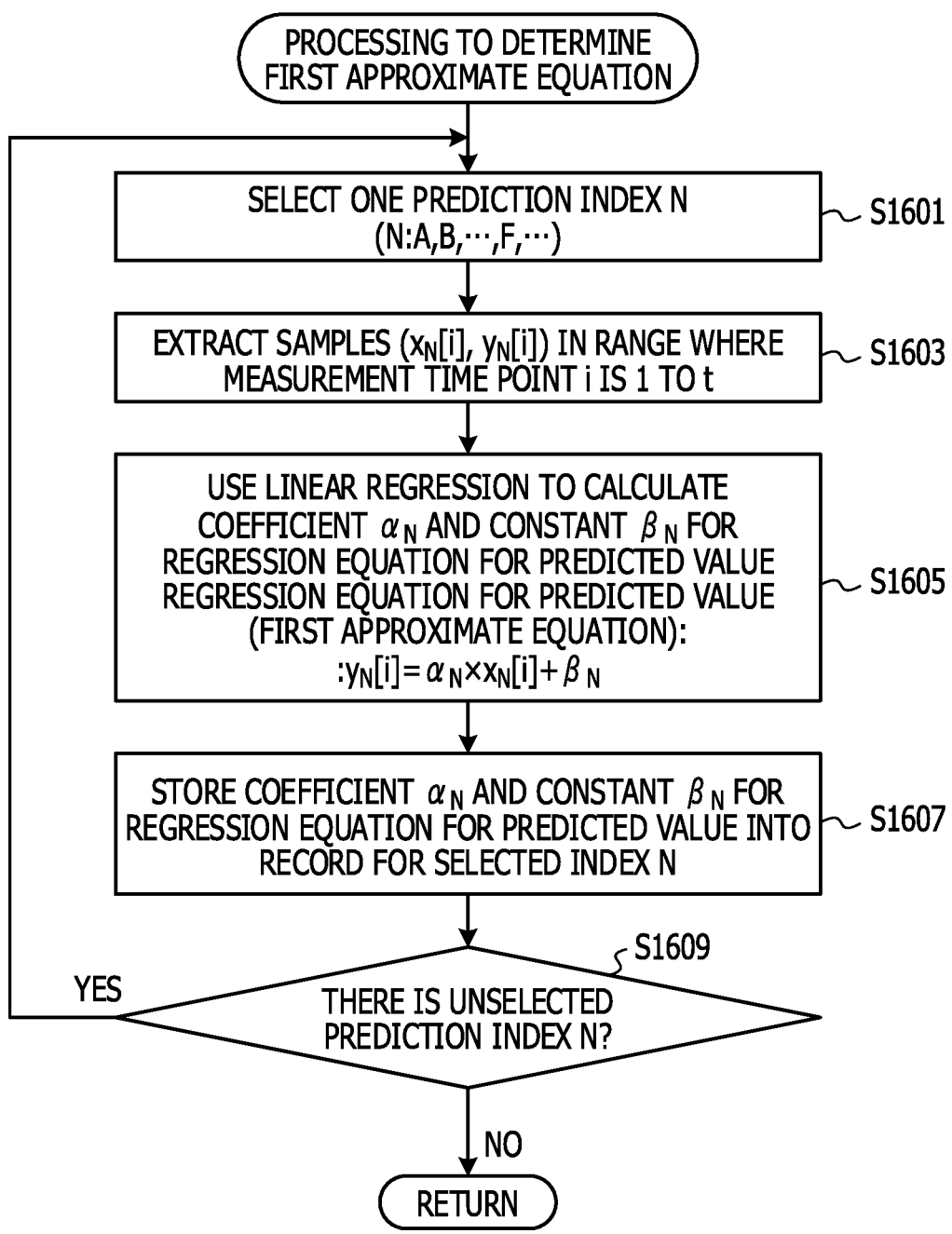
FIG. 16 is a diagram illustrating a flowchart of processing to determine first approximate equations.

FIG. 16 illustrates a flowchart of the processing to determine first approximate equations. The first determination part 613 selects one prediction index N (S1601).

As samples, the first determination part 613 extracts pairs of the measured value $x_N[i]$ and the original predicted value $y_N[i]$ within a range where, for example, the measurement time point i is 1 to t (S1603).

Using linear regression that uses the extracted samples, the first determination part 613 calculates a coefficient $\alpha_N$ and a constant $\beta_N$ for a regression equation for a predicted value (S1605). The regression equation for a predicted value is an example of a first approximate equation for finding an approximation of the original predicted value $y_N[i]$ based on the measured value $x_N[i]$. The regression equation for a predicted value is $y_N[i] = \alpha_N \times x_N[i] + \beta_N$.

Figure 17:
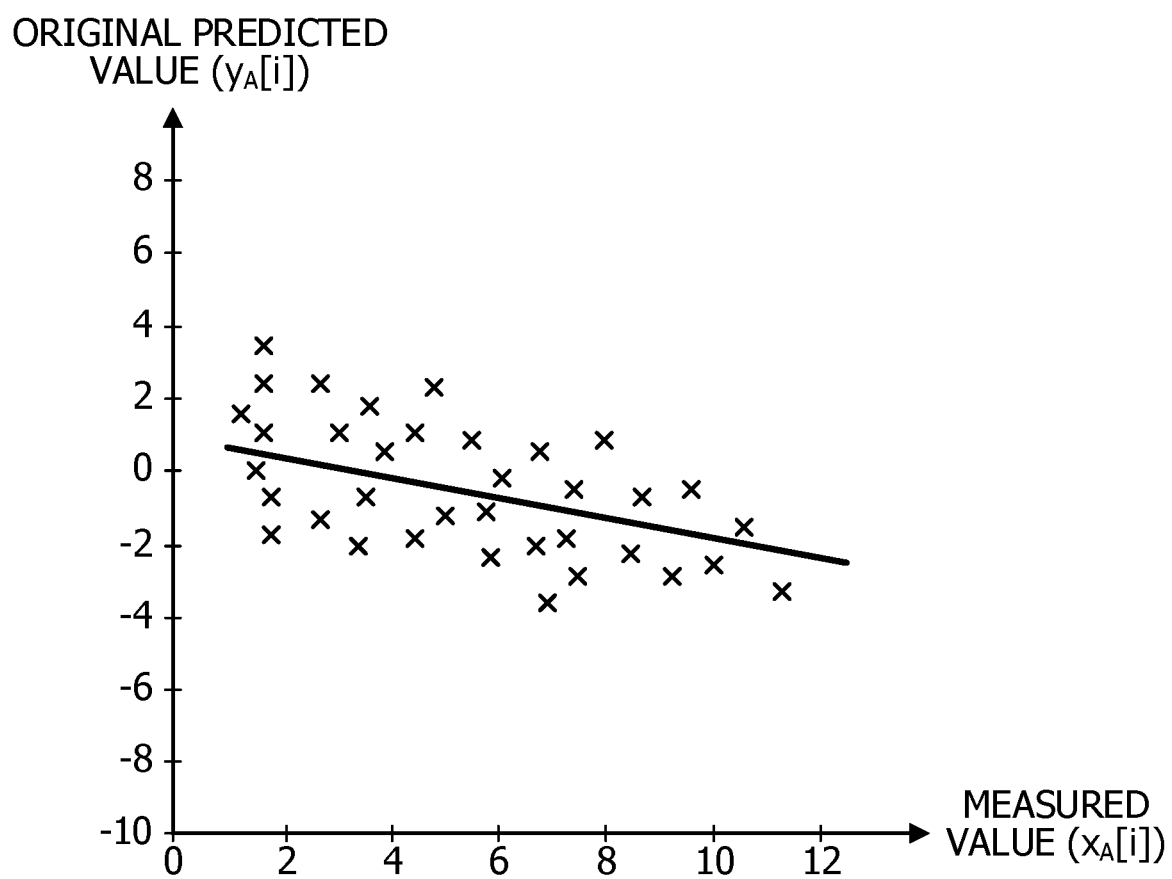
FIG. 17 is a diagram illustrating an example of a regression line of an original predicted value.

FIG. 17 illustrates an example of a regression line of an original prediction value. The example illustrated in FIG. 17 concerns the prediction index A. The horizontal axis represents the measured value $x_A[i]$ of the prediction index A, and the vertical axis represents the original predicted value $y_A[i]$ of the prediction index A. The points indicated with a cross are the samples. The straight line in FIG. 17 is a regression line expressed by a regression equation for a predicted value.

Referring back to the flowchart in FIG. 16, the first determination part 613 stores the coefficient $\alpha_N$ and the constant $\beta_N$ for the regression equation for a predicted value into the record for the selected index N in the first approximate equation table (S1607).

FIG. 18 illustrates an example of the first approximate equation table. The first approximate equation table in this example has a record for each prediction index. Each record of the first approximate equation table has a field for storing the coefficient $\alpha_N$ and a field for storing the constant $\beta_N$.

Referring back to the flowchart in FIG. 16. The first determination part 613 determines whether there is any unselected index N (S1609). If it is determined that there is any unselected prediction index N, the flowchart proceeds back to the processing in S1601 and repeats the above processing. If it is determined conversely that there is no unselected prediction index N, the processing to determine first approximate equations is ended, and the flowchart returns to the calling main processing.

Referring back to the flowchart in FIG. 7, the first correction part 617 performs the first correction processing (S713).

Figure 19:
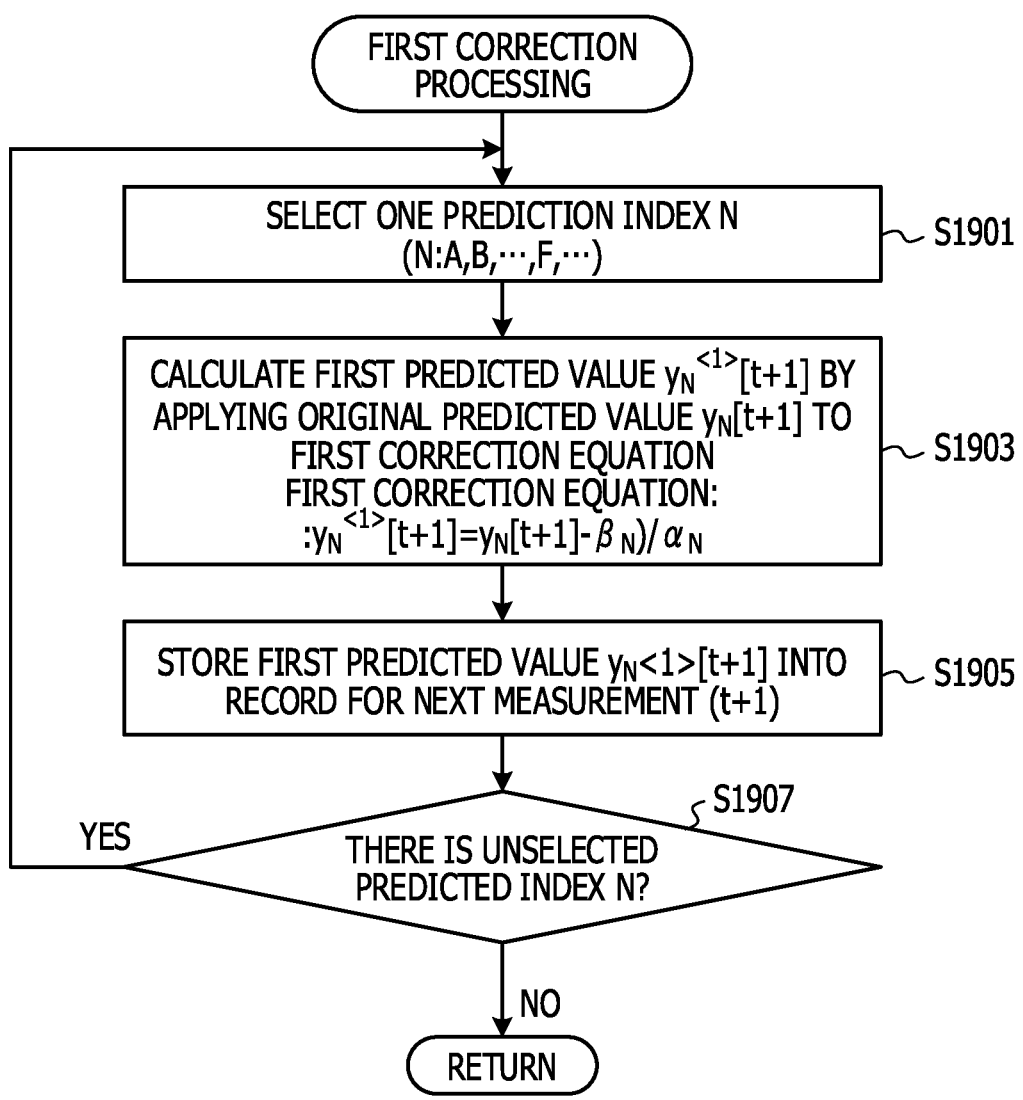
FIG. 19 is a diagram illustrating a flowchart of first correction processing.

FIG. 19 illustrates a flowchart of the first correction processing. The first correction part 617 selects one prediction index N (S1901).

The first correction part 617 calculates a first predicted value $y_N^{<1>}[t+1]$ by applying the original predicted value $y_N[t+1]$ to a first correction equation (S1903). The first correction equation is $y_N^{<1>}[t+1] = (y_N[t+1] - \beta_N)/\alpha_N$. The first correction equation is equivalent to an equation which is based on the first approximate equation and replaces the predicted value $y_N[i]$ and the measured value $x_N[i]$ in the first approximate equation with the original predicted value $y_N[t+1]$ and the first predicted value $y_N^{<1>}[t+1]$, respectively. Thus, the first predicted value $y_N^{<1>}[t+1]$ is closer to the measured value $x_N[t+1]$ obtained in the next measurement (t+1).

The first correction part 617 stores the first predicted value $y_N^{<1>}[t+1]$ into the record for the next measurement (t+1) in the first predicted value table (S1905).

Figure 20:
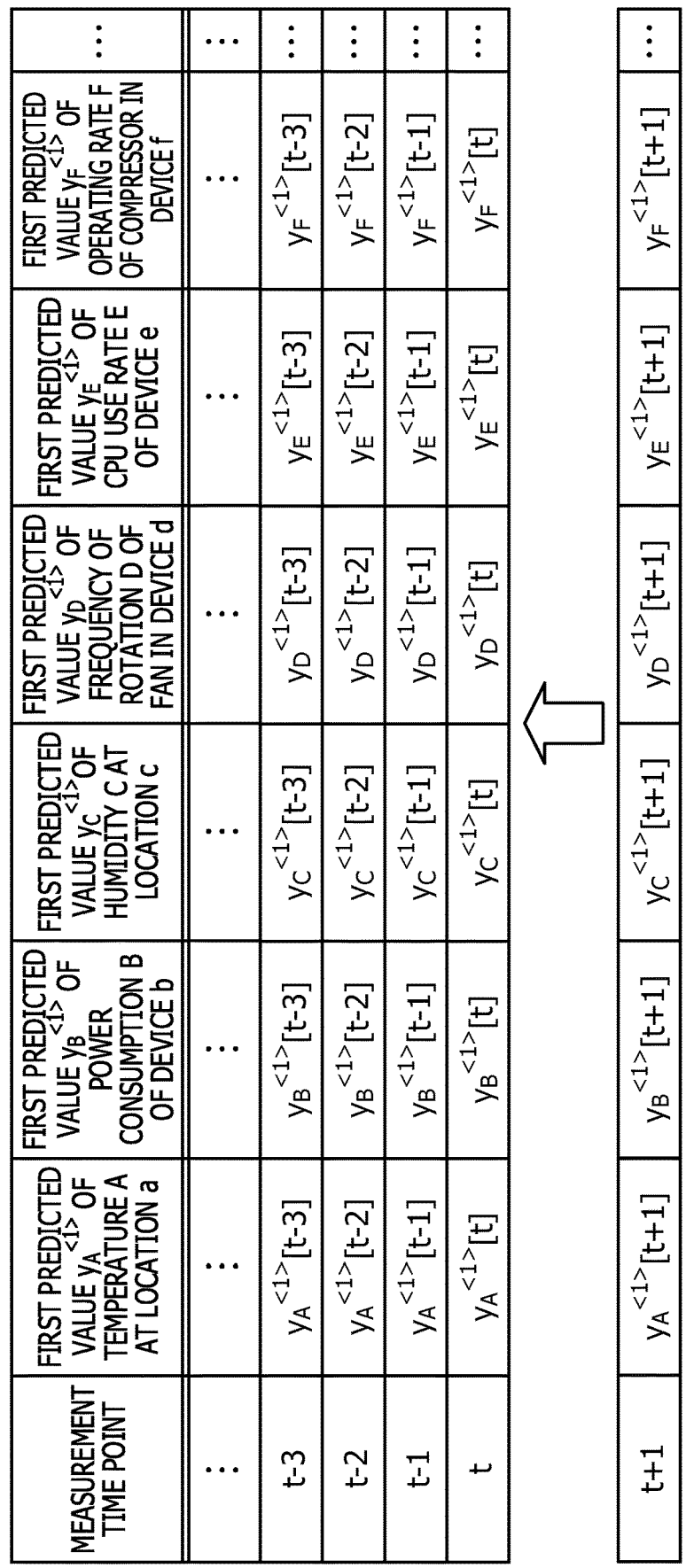
FIG. 20 is a diagram illustrating an example of a first predicted value table.

FIG. 20 illustrates an example of the first predicted value table. The first predicted value table in this example has a record for each measurement time point. Each record of the first predicted value table has a field for storing a measurement time point, a field for storing a first predicted value $y_A^{<1>}$ of the temperature A at the location a, a field for storing a first predicted value $y_B^{<1>}$ of the power consumption B of the device b, and a field for storing a first predicted value $y_C^{<1>}$ of the humidity C at the location c. Each record of the first predicted value table further has a field for storing a first predicted value $y_D^{<1>}$ of the frequency of rotation D of the fan in the device d, a field for storing a first predicted value $y_E^{<1>}$ of the CPU use rate E of the device e, and a field for storing a first predicted value $y_F^{<1>}$ of the operating rate F of the compressor in the device f.

Referring back to the flowchart in FIG. 19, the first correction part 617 determines whether there is any unselected prediction index N (S1907). If it is determined that there is any unselected prediction index N, the flowchart proceeds back to the processing in S1901 and repeats the above processing. If it is conversely determined that there is no unselected prediction index N, the first correction processing is ended, and the flowchart returns to the calling main processing.

Figure 21:
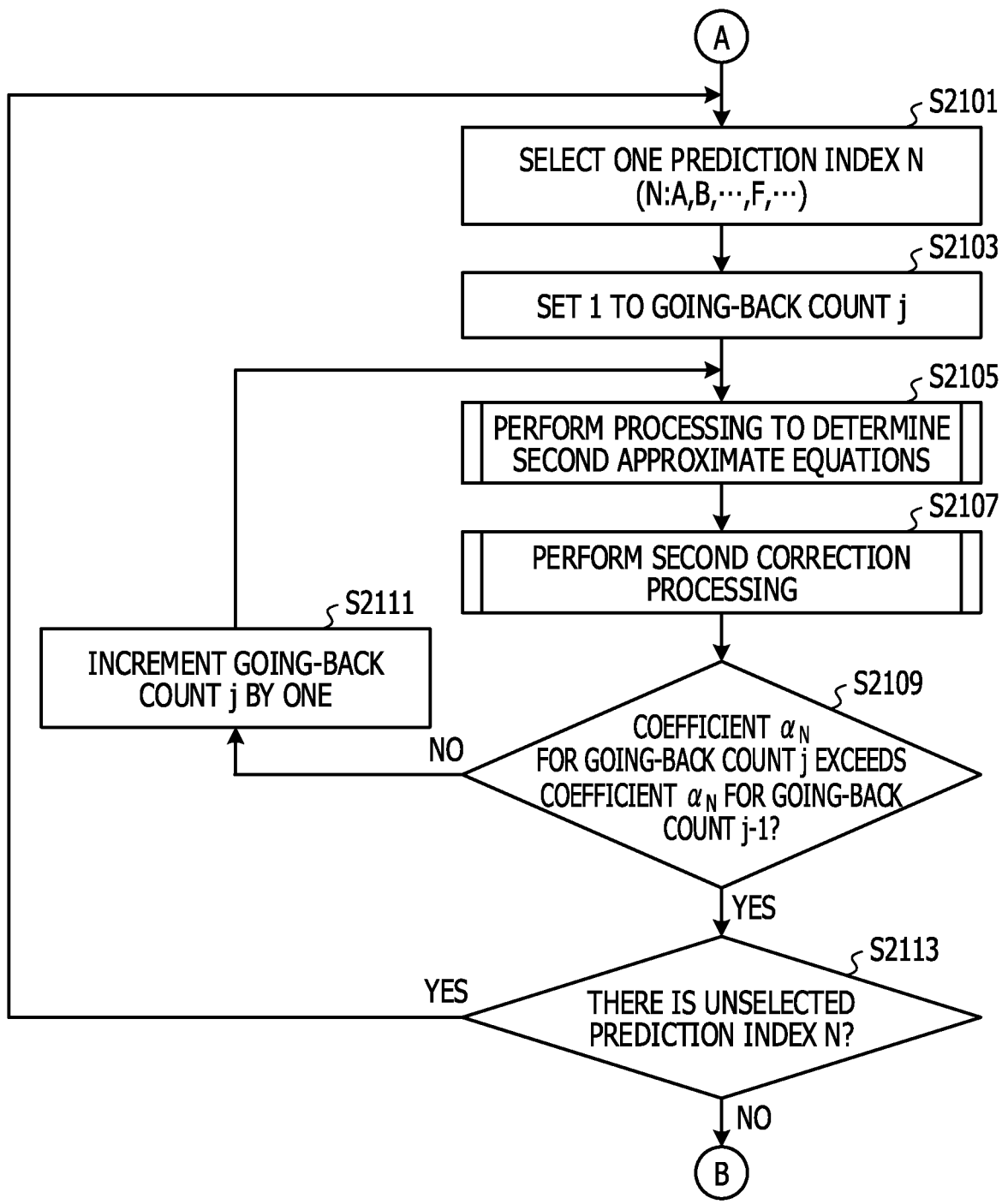
FIG. 21 is a diagram illustrating a flowchart of the main processing.

Referring back to the flowchart in FIG. 7, after S713 of the first correction processing, the flowchart proceeds to processing in S2101 illustrated in FIG. 21 via terminal A.

Proceeding to the main processing illustrated in FIG. 21, the second determination part 615 selects one prediction index N (S2101). The second determination part 615 sets 1 to the going-back count j which is an internal parameter (S2103).

The second determination part 615 performs processing to determine second approximate equations (S2105).

Figure 22:
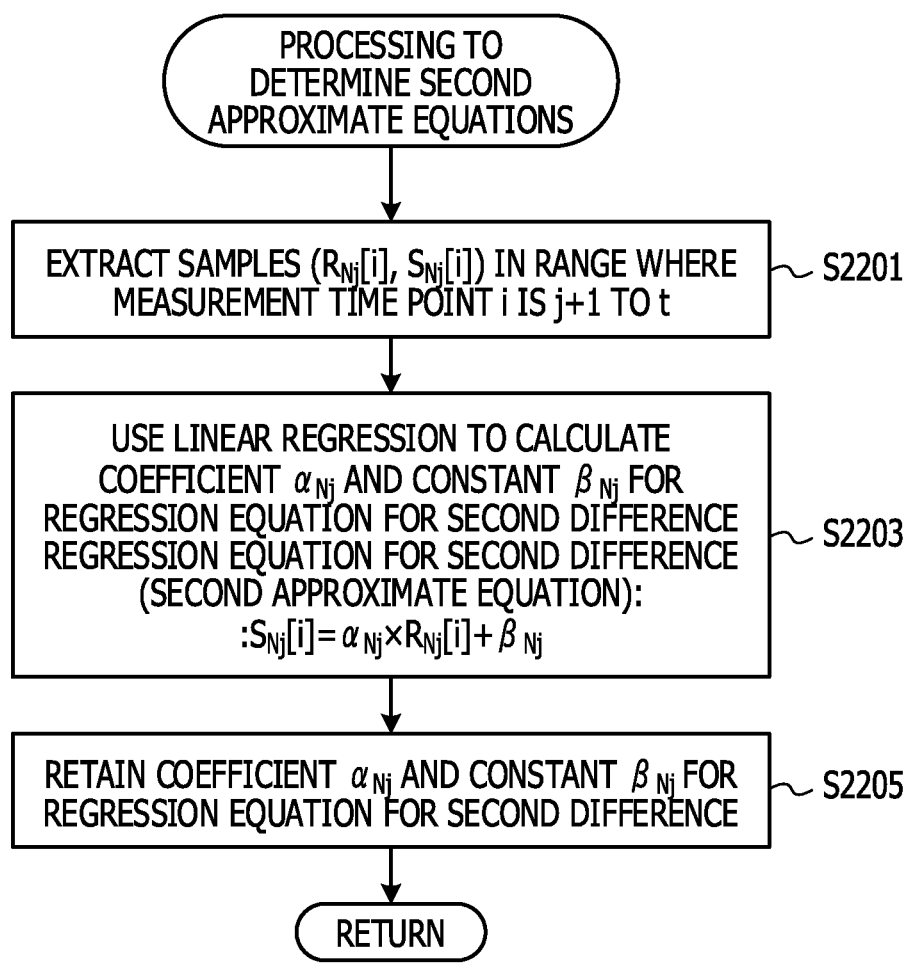
FIG. 22 is a diagram illustrating a flowchart of processing to determine second approximate equations.

FIG. 22 illustrates a flowchart of the processing to determine second approximate equations. The second determination part 615 extracts pairs of the first difference $R_{Nj}[i]$ and the second difference $S_{Nj}[i]$ within a range where, for example, the measurement time point i is j+1 to t (S2201).

Using linear regression that uses the extracted samples, the second determination part 615 calculates a coefficient $\alpha_{Nj}$ and a constant $\beta_{Nj}$ for a regression equation for a second difference (S2203). The regression equation for a second difference is an example of a second approximate equation for finding an approximation of the second difference $S_{Nj}[i]$ based on the first difference $R_{Nj}[i]$. The regression equation for a second difference is $S_{Nj}[i]=\alpha_{Nj} \times R_{Nj}[i]+\beta_{Nj}$.

Figure 23:
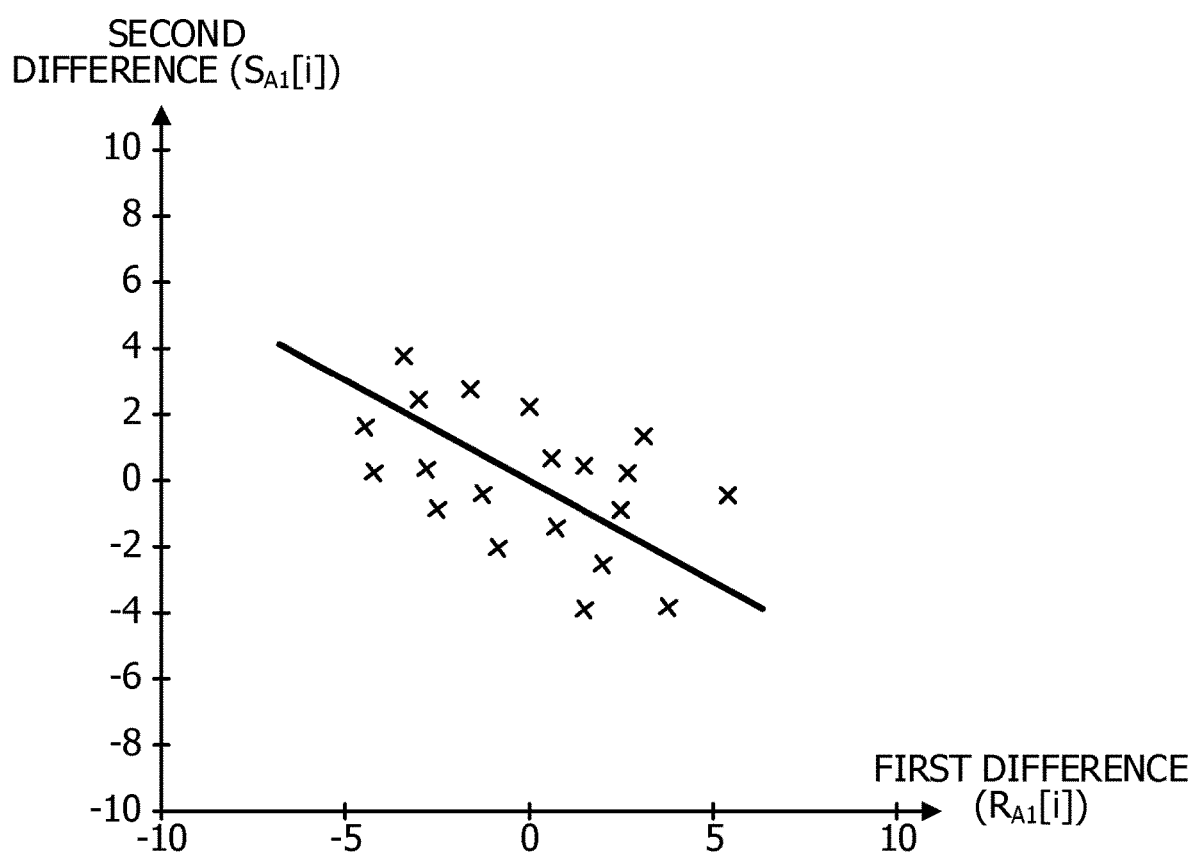
FIG. 23 is a diagram illustrating an example of a regression line of a second difference.

FIG. 23 illustrates an example of a regression line for a second difference. The example in FIG. 23 concerns the prediction index A. The horizontal axis represents the first difference $R_{A1}[i]$ with a going-back count of 1, and the vertical axis represents the second difference $S_{A1}[i]$ with a going-back count of 1. The points indicated with a cross are the samples. The straight line in FIG. 23 is a regression line expressed by the regression equation for a second difference.

Referring back to the flowchart in FIG. 22, the second determination part 615 retains the coefficient $\alpha_{Nj}$ and the constant $\beta_{Nj}$ for the regression equation for a second difference as internal parameters (S2205). After the processing to determine second approximate equations ends, the flowchart returns to the calling main processing.

Referring back to the flowchart in FIG. 21, the second correction part 619 performs second correction processing (S2107).

Figure 24:
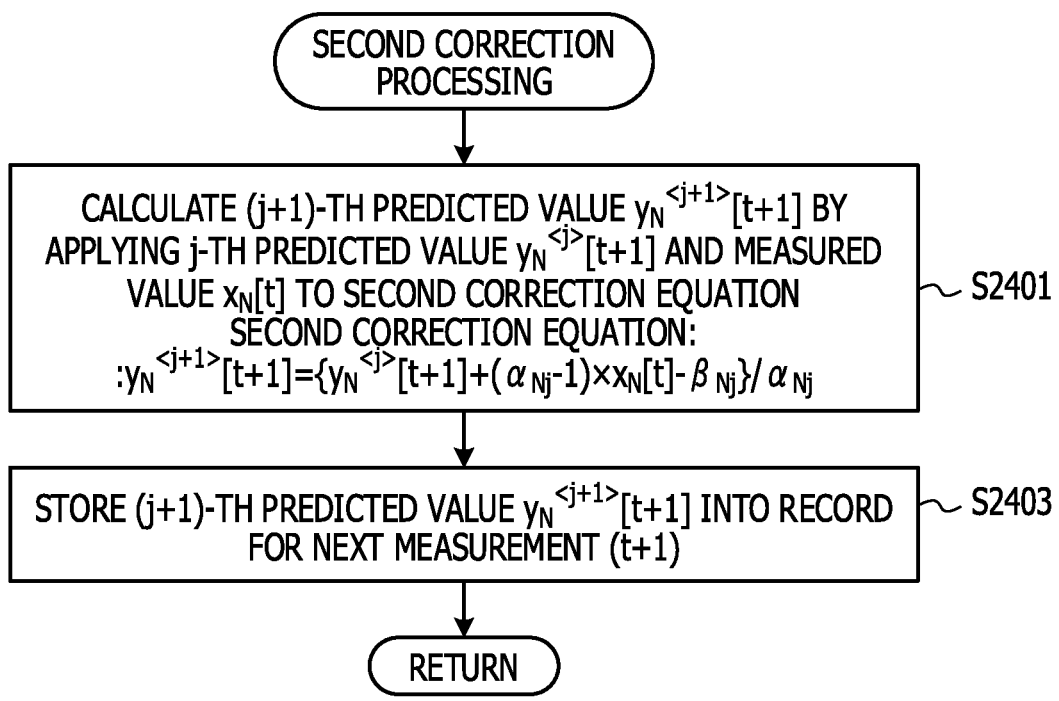
FIG. 24 is a diagram illustrating a flowchart of second correction processing.

FIG. 24 illustrates a flowchart of the second correction processing. The second correction part 619 calculates a (j+1)-th predicted value $y_N^{<j+1>}[t+1]$ by applying a j-th predicted value $y_N^{<j>}[t+1]$ and the measured value $x_N[t]$ to a second correction equation (S2401).

For example, in the second correction processing for the first time (j=1), the second correction part 619 calculates the second predicted value $y_N^{<2>}[t+1]$ by applying the first predicted value $y_N^{<j>}[t+1]$ and the measured value $x_N[t]$ to a second correction equation: $y_N^{<2>}[t+1]=\{y_N^{<1>}[t+1]+(\alpha_{N1}-1) \times x_N[t]-\beta_{N1}\}/\alpha_{N1}$.

The second correction equation used in the second correction processing for the first time (j=1) is equivalent to an equation which is based on the definition of the first difference, the definition of the second difference, and the second approximate equation and which replaces the original predicted value $y_N[i]$, the measured value $x_N[i]$, and the measured value $x_N[i-1]$ with the j-th predicted value $y_N^{<1>}[t+1]$, the (j+1)-th predicted value $y_N^{<2>}[t+1]$, and the measured value $x_N[t]$, respectively.

A general second correction equation is $y_N^{<j+1>}[t+1]=\{y_N^{<j>}[t+1]+(\alpha_{Nj}-1) \times x_N[t]-\beta_{Nj}\}/\alpha_{Nj}$. This equation is equivalent to an equation which is based on the definition of the first difference, the definition of the second difference, and the second approximate equation and which replaces the original predicted value $y_N[i]$, the measured value $x_N[i]$, and the measured value $x_N[i-j]$ with the j-th predicted value $y_N^{<j>}[t+1]$, the (j+1)-th predicted value $y_N^{<j+1>}[t+1]$, and the measured value $x_N[t+1-j]$, respectively.

The second correction part 619 stores the (j+1)-th predicted value $y_N^{<j+1>}[t+1]$ into the record for the next measurement (t+1) in the second predicted value table (S2403).

Figure 25:
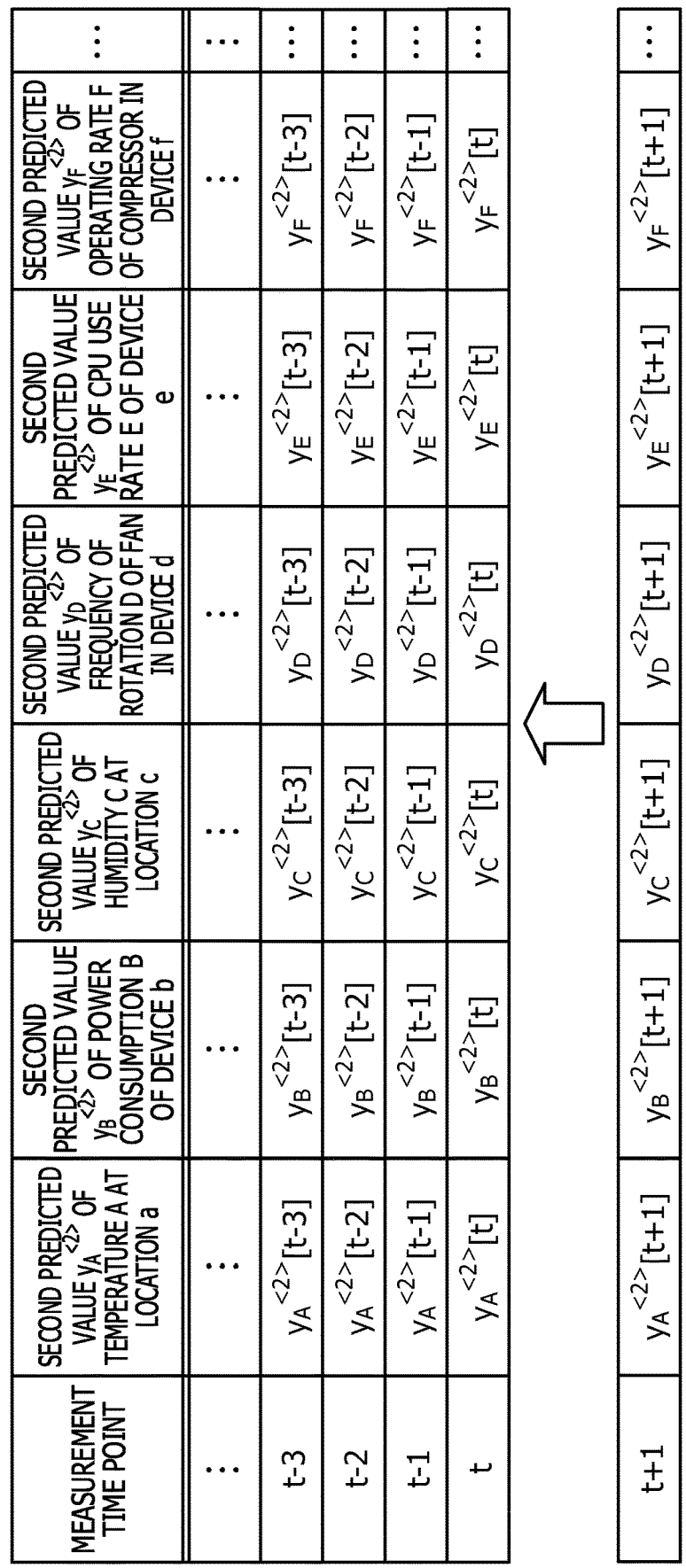
FIG. 25 is a diagram illustrating an example of a second predicted value table.

FIG. 25 illustrates an example of the second predicted value table. The second predicted value table in this example has a record for each measurement time point. Each record of the second predicted value table has a field for storing a measurement time point, a field for storing a second predicted value $y_A^{<2>}$ of the temperature A at the location a, a field for storing a second predicted value $y_B^{<2>}$ of the power consumption B of the device b, and a field for storing a second predicted value $y_C^{<2>}$ of the humidity C at the location c. Each record of the second predicted value table further has a field for storing a second predicted value $y_D^{<2>}$ of the frequency of rotation D of the fan in the device d, a field for storing a second predicted value $y_E^{<2>}$ of the CPU use rate E of the device e, and a field for storing a second predicted value $y_F^{<2>}$ of the operating rate F of the compressor in the device f.

Referring back to the flowchart in FIG. 21, the second determination part 615 determines whether the coefficient $\alpha_N$ for the going-back count j exceeds the coefficient $\alpha_N$ for the going-back count j−1 (S2109). In this example, when the coefficient $\alpha_N$ for the going-back count j exceeds the coefficient $\alpha_N$ for the going-back count j−1, it is determined that correction of the predicted value is complete, and the iteration is ended. Alternatively, the iteration may be ended when the going-back count j reaches a predetermined value.

If it is determined that the coefficient $\alpha_N$ for the going-back count j does not exceed the coefficient $\alpha_N$ for the going-back count j−1, the second determination part 615 increments the going-back count j by one (S2111). Then, the flowchart proceeds back to the processing in S2105 and repeats the above processing. If it is conversely determined that the coefficient $\alpha_N$ for the going-back count j exceeds the coefficient $\alpha_N$ for the going-back count j−1, the second determination part 615 determines whether there is any unselected prediction index N (S2113).

Figure 26:
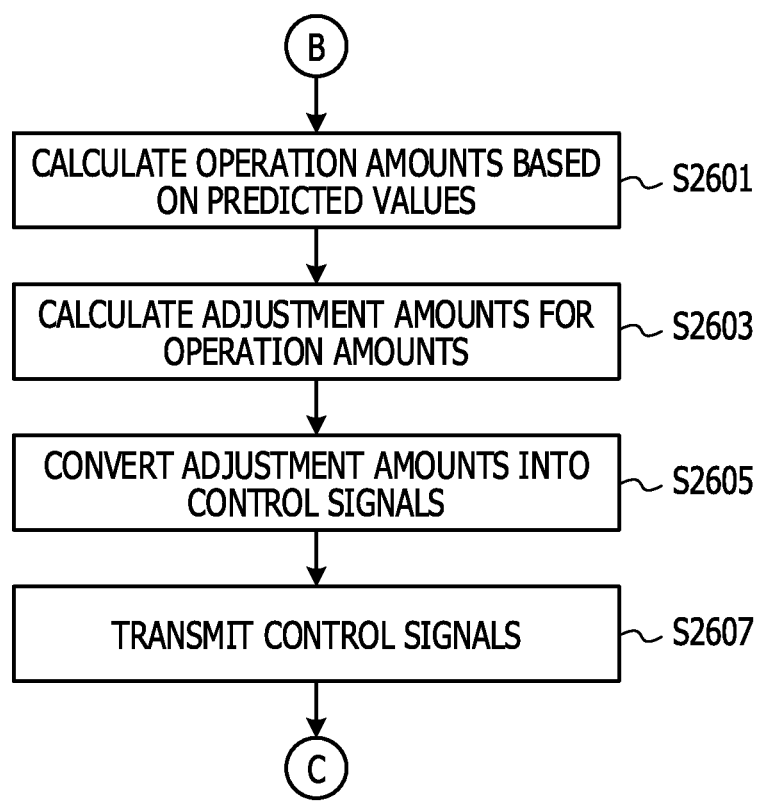
FIG. 26 is a diagram illustrating a flowchart of the main processing.

If it is determined that there is any unselected prediction index N, the flowchart proceeds back to the processing in S2101 and repeats the above processing. If it is conversely determined that there is no unselected prediction index N, the flowchart proceeds to the processing in S2601 illustrated in FIG. 26 via terminal B.

Control of the air conditioner 103 based on the predicted values for the indices is performed with a conventional technique, and is therefore described only briefly herein. The fourth calculation part 611 calculates operation amounts for the air conditioner 103 based on the final predicted values obtained for the respective predicted indices (S2601). The fourth calculation part 611 calculates adjustment amounts for the operation amounts based on the operation amounts currently set in the air conditioner 103 (S2603). The conversion part 621 converts the adjustment amounts for the operation amounts into control signals (S2605). The transmission part 623 transmits the control signals to the air conditioner 103 (S2607). The air conditioner 103 operates according to the control signals. The flowchart then returns to the processing in S701 of FIG. 7 via terminal C.

According to the present embodiment, prediction accuracy may be improved for measurement indices used in the environmental management of a data center.

According to the present embodiment, accuracy of correcting predicted values may be improved using regression analysis.

The second correction may be omitted, and only the first correction may be performed. Conversely, the first correction may be omitted, and only the second correction may be performed.

Although the embodiment of the disclosure has been described, the disclosure is not limited to the embodiment. For example, the functional block configuration described above may not be consistent with a program module configuration.

The above-described structure of the storage areas is merely an example, and the disclosure is not limited thereto. Further, the processes in the flowcharts may be changed in order, or two or more processes may be performed in parallel, as long as it does not change the processing outcome.

The air conditioner controller 101 described above is a computer device in which, as illustrated in FIG. 27, a memory 2501, a CPU 2503, a hard disk drive (HDD) 2505, a display controller 2507 connected to a display device 2509, a drive device 2513 for a removable disk 2511, an input device 2515, and a communication controller 2517 for connecting to a network are connected to one another via a bus 2519. An operating system (OS) and application programs for implementing the processing in the embodiment are stored in the HDD 2505, and are loaded from the HDD 2505 into the memory 2501 when they are to be executed by the CPU 2503. The CPU 2503 controls the display controller 2507, the communication controller 2517, and the drive device 2513 according to the processing details selected by the application programs and causes them to perform predetermined operations. Data currently being processed is stored mainly in the memory 2501, but may be stored in the HDD 2505. In the embodiment of the disclosure, the application programs for implementing the above-described processing are stored in the computer-readable removable disk 2511, distributed, and installed from the drive device 2513 to the HDD 2505. The application programs may be installed into the HDD 2505 via a network, such as the Internet, and the communication controller 2517. Such a computer device implements the various functions described above when hardware such as the CPU 2503 and the memory 2501 organically cooperate with programs such as the OS and the application programs.

The embodiment of the disclosure described above may be summed up as follows.

The management apparatus according to the embodiment is a data center management apparatus that manages a data center and comprises: (A) a measurement data storage that stores measured data obtained as measurement data for a device in the data center and difference data each concerning the measurement data obtained a predetermined period ago; (B) a predicted data calculation part that calculates predicted data based on the measurement data and the difference data and stores the predicted data into a prediction data storage; (C) a measurement part that stores the measured measurement data into the measurement data storage as the above-mentioned measured data; (D) an amount of change calculation part that, based on each measured data stored in the measurement data storage, calculates an amount of change which is the difference between the measured data and the predicted data and stores the calculated amount of change into the predicted data storage; (E) a corrected prediction data generation part that calculates first corrected prediction data (predicted data obtained by correction of the predicted data) based on the current measured data and the previous measured data stored in the measurement data storage, and calculates second corrected prediction data (predicted data obtained by correction of the first predicted data) based on the previous amounts of change and the first corrected prediction data; and (F) a control part that controls the device using an operation amount calculated based on the corrected prediction data.

With such a configuration, prediction accuracy may be improved for the measurement indices used in the environmental management of the data center.

The measurement data storage 636 illustrated in FIG. 6 is an example of the above measurement data storage. The prediction data storage 638 illustrated in FIG. 6 is an example of the above prediction data storage. The first calculation part 605 illustrated in FIG. 6 is an example of the above predicted data calculation part. The measurement part 603 illustrated in FIG. 6 is an example of the above the above measurement part. The third calculation part 609 illustrated in FIG. 6 is an example of the above amount of change calculation part. The corrected prediction data generation unit 620 illustrated in FIG. 6 is an example of the above corrected prediction data generation part. The control unit 624 illustrated in FIG. 6 is an example of the above control part.

Further, the corrected prediction data generation part may calculate the first corrected prediction data based on the current measurement data and the slope and intercept of a first approximate line expressing the previous measured data stored in the measurement data storage.

In this way, the accuracy of correcting predicted values may be improved based on the first approximate line expressing the previous measured data.

Further, the corrected prediction data generation part may calculate a second slope and a second intercept of a second approximate line expressing previous amounts of change and calculate the second corrected prediction data based on the first corrected prediction data, each amount of change calculated based on the previous amounts of change, and the second slope and the second intercept.

In this way, the accuracy of correcting predicted values may be improved based on the second approximate line expressing the previous amounts of change.

Programs for causing a computer to execute the above-described processing in the management apparatus may be created and stored in, for example, a computer-readable storage medium or a storage device such as a flexible disk, a CD-ROM, a magneto-optical disk, a semiconductor memory, or a hard disk. Typically, intermediate processing results are temporarily stored in a storage device such as main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A data center management method executed by a computer that manages environmental conditions at a data center, the data center management method comprising:

acquiring a measured value of at least one characteristic of at least one of the environmental conditions, data center equipment and environment conditioning equipment, for each of a plurality of time points;

calculating first differences by subtracting, for the plurality of time points, the measured value acquired at an immediately preceding time point, respectively;

calculating, for each of the plurality of time points, a first predicted value for next time point by using a prediction model, generated based on the calculated first differences, predicting the environmental conditions;

calculating second differences by subtracting, for each of the plurality of time points, the measured value acquired at a time point from the first predicted value calculated for a next time point by using the prediction model;

specifying a first approximation equation for finding a first approximation of the first predicted value based on the measured value for each of the time points, by executing a regression analysis using the measured value and the first predicted value corresponding to each time point in a first sample of the time points;

generating a first correction equation by using terms in the first approximation equation to calculate a second predicted value from the first predicted value;

calculating first corrected prediction data by using the first correction equation, the first corrected prediction data being obtained by correction of the first predicted value for the plurality of time points;

specifying a second approximation equation for finding a second approximation of the second differences based on the first differences by executing the regression analysis using a second sample of the first differences and the second differences of corresponding measurement times in the sample;

generating a second correction equation by using terms in the second approximation equation to calculate a third predicted value of a measurement time point from the second predicted value of the measurement time point and the measured value at the immediately preceding time point;

calculating second corrected prediction data by using the second correction equation, the second corrected prediction data being obtained by correction of the first corrected prediction data; and controlling a device affecting the environmental conditions using an operation amount calculated based on the second corrected prediction data.

2. The data center management method according to claim 1, wherein the calculating first corrected prediction data includes calculating the first corrected prediction data based on the current measured value and a slope and an intercept of a first approximate line expressing the previous measured values.

3. The data center management method according to claim 1, wherein the calculating second corrected prediction data includes:

calculating a second slope and a second intercept of a second approximate line expressing the previous amounts of change, and calculating the second corrected prediction data based on the first corrected prediction data, each change amount calculated based on the previous amounts of change, the second slope, and the second intercept.

4. The data center management method according to claim 1, wherein the calculating first corrected prediction data includes specifying the first correction equation in which a relation between the measured value and the predicted value for the measurement time point in the first approximate equation is applied to the predicted value before correction and the predicted value after correction.

5. The data center management method according to claim 4, wherein the calculating second corrected prediction data includes: specifying the second correction equation in which a relation between the measured value and the predicted value in the second approximate equation is applied to the predicted value before correction and the predicted value after correction.

6. The data center management method according to claim 1, wherein the measured value includes at least one of a temperature at a first location, a power consumption of a first device, a humidity at a second location, a frequency of rotation of a fan in a second device, a use rate of a processor in a third device, and an operating rate of a compressor in a fourth device.

7. The data center management method according to claim 1, wherein the predicted value is calculated using a just-in-time (JIT) modeling method.

8. The data center management method according to claim 1, wherein the device is an air conditioner.

9. The data center management method according to claim 7, wherein the controlling includes:

calculating an adjustment amount for the operating amount based on the operating amount, converting the calculated adjustment amount into a control signal, and transmitting the converted control signal to the device.

10. A management apparatus that manages environmental conditions at a data center, the management apparatus comprising:

a memory; and a processor connected to the memory and configured to:

acquire a measured value of at least one characteristic of at least one of the environmental conditions, data center equipment and environment conditioning equipment, for each of a plurality of measurement time points;

calculate first differences by subtracting, for the plurality of time points, the measured value acquired at an immediately preceding time point, respectively;

calculate, for each of the plurality of time points, a first predicted value for a next time by using a prediction model, generated based on the calculated first differences, predicting the environmental conditions;

calculate second differences by subtracting, for each of the plurality of time points, the measured value acquired at a time point from the first predicted value calculated for a next time point by using the prediction model;

specify a first approximation equation for finding a first approximation of the first predicted value based on the measured value for each of the time points, by executing a regression analysis using the measured value and the first predicted value corresponding to each time point in a first sample of the time points;

generate a first correction equation by using terms in the first approximation equation to calculate a second predicted value from the first predicted value;

calculate first corrected prediction data by using the first correction equation, the first corrected prediction data being obtained by correction of the first predicted value for the plurality of time points;

specify a second approximation equation for finding a second approximation of the second differences based on the first differences by executing the regression analysis using a second sample of the first differences and the second differences of corresponding measurement times in the sample;

generate a second correction equation by using terms in the second approximation equation to calculate a third predicted value of a measurement time point from the second predicted value of the measurement time point and at the immediately preceding time point;

calculate second corrected prediction data by using the second correction equation, the second corrected prediction data being data obtained by correction of the first corrected prediction data; and control a device affecting the environmental conditions using an operation amount calculated based on the second corrected prediction data.

11. A data center system, comprising:

a data center; and a management apparatus that manages environmental conditions at the data center, wherein the management apparatus includes:

a memory; and a processor connected to the memory and configured to:

acquire a measured value of at least one characteristic of at least one of the environmental conditions, data center equipment and environment conditioning equipment, for each of a plurality of measurement time points;

calculate first differences by subtracting, for the plurality of time points, the measured value acquired at an immediately preceding time point, respectively;

calculate, for each of the plurality of time points, a first predicted value for a next time by using a prediction model, generated based on the calculated first differences, predicting the environmental conditions;

calculate second differences by subtracting, for each of the plurality of time points, the measured value acquired at a time point from the first predicted value calculated for a next time point by using the prediction model;

specify a first approximation equation for finding a first approximation of the first predicted value based on the measured value for each of the time points, by executing a regression analysis using the measured value and the first predicted value corresponding to each time point in a first sample of the time points;

generate a first correction equation by using terms in the first approximation equation to calculate a second predicted value from the first predicted value;

calculate first corrected prediction data by using the first correction equation, the first corrected prediction data being obtained by correction of the first predicted value for the plurality of time points;

specify a second approximation equation for finding a second approximation of the second differences based on the first differences by executing the regression analysis using a second sample of the first differences and the second differences of corresponding measurement times in the sample;

generate a second correction equation by using terms in the second approximation equation to calculate a third predicted value of a measurement time point from the second predicted value of the measurement time point and at the immediately preceding time point;

calculate second corrected prediction data by using the second correction equation, the second corrected prediction data being data obtained by correction of the first corrected prediction data; and control a device affecting the environmental conditions using an operation amount calculated based on the second corrected prediction data.

* * * * *